United States Patent [19]
Bates et al.

[11] Patent Number: 5,390,295
[45] Date of Patent: Feb. 14, 1995

[54] METHOD AND APPARATUS FOR PROPORTIONALLY DISPLAYING WINDOWS ON A COMPUTER DISPLAY SCREEN

[75] Inventors: Cary L. Bates, Rochester; Jeffrey M. Ryan, Byron, both of Minn.

[73] Assignee: International Business Machines Corporation, Armonk, N.Y.

[21] Appl. No.: 811,548

[22] Filed: Dec. 20, 1991

[51] Int. Cl.⁶ .................................................. G06F 3/14
[52] U.S. Cl. ................................. 395/157; 395/159; 395/161
[58] Field of Search ............. 340/715; 395/155, 157, 395/159, 161

[56] References Cited

U.S. PATENT DOCUMENTS 4,819,189  4/1989  Kikuchi et al. ................... 364/521
5,060,170 10/1991  Bourgeois et al. ............. 395/157 X

FOREIGN PATENT DOCUMENTS 1267725  4/1988  Japan .................................. 395/157

OTHER PUBLICATIONS

Microsoft Windows User's Guide (Trademark of Microsoft Corporation), 1990, pp. x, 20, 23, 44, 49 & 85.
Algorithm for Optimum Window Positioning, IBM Technical Disclosure Bulletin, vol. 32, No. 8B, Jan. 1990, pp. 311–312, D. W. Dickson.
"Dynamic Icons For Information Visualization", Research Disclosure, Aug. 1991, No. 328, Emsworth, GB.

*Primary Examiner*—Heather R. Herndon
*Assistant Examiner*—Cliff N. Vo
*Attorney, Agent, or Firm*—Curtis G. Rose; Andrew J. Dillon

[57] ABSTRACT

A method and apparatus for logically organizing windows displayed on a display screen. The amount of time each of the windows presented to the display screen is active (also known as "in focus") is monitored. Upon receipt of a command from the user, the windows that were active a longer length of time are displayed more distinctively than windows that were active a shorter length of time. More specifically, windows are displayed on the display screen having a window size proportional, to the length of time each of the window were active. For example, a window that was active 40% of the time will have a size that is 40% of the specified window tiling area. Windows that have not been active long enough to exceed a minimum window tiling threshold are displayed as icons outside of or under the specified window tiling area and are not included in the calculations of percentage of activity of the windows.

18 Claims, 23 Drawing Sheets

| FM | | |
|---|---|---|
| Turbo Tax | Excel | |
| Quicken | Word Perfect | Lotus 1-2-3 |

FIG. 2F

| FM | | |
|---|---|---|
| Turbo Tax | Excel | |
| Quicken | Word Perfect | Lotus 1-2-3 |

FIG. 2G

| Control Data 30 | |
|---|---|
| 31—ON/OFF Flag | ON |
| 32—Timer | 000001000 |
| 33—Sampling Rate | 2 |
| 34—Suspend | FALSE |
| 36—Last Event | 996 |
| 37—Inactivity Timeout | 5 |
| 38—Save | ON |
| 51—Tiling Area (ULx,y,LRx,y) | 0,140,200,0 |
| 52—Proportional Tiling | ON |
| 53—Best Fit Tiling | ON |
| 54—Minimum Tiling Percentage | 5 |

FIG. 3A

Window Data 40

| 41 Window Title | 42 In Focus | 43 Total | 44 Region (ULx,y,LRx,y) |
|---|---|---|---|
| Word Perfect MY.TXT | 900 | 70 | 0,0,0,0 |
| File Manager | 10 | 30 | 0,0,0,0 |
| Lotus 1-2-3 | 985 | 50 | 0,0,0,0 |
| Quicken | 800 | 350 | 0,0,0,0 |
| Excel | 750 | 100 | 0,0,0,0 |
| Turbo Tax | 875 | 400 | 0,0,0,0 |

FIG. 3B

| Window Data (Sorted) 40 | | |
|---|---|---|
| 41 Window Title | 42 In Focus | 43 Total | 44 Region (ULx,y,LRx,y) |
| Turbo Tax | 875 | 400 | 0,140,83,0 |
| Quicken | 800 | 350 | 83,140,155,0 |
| Excel | 750 | 100 | 155,140,200,76 |
| Word Perfect MY.TXT | 900 | 70 | 155,76,200,32 |
| Lotus 1-2-3 | 985 | 50 | 155,32,200,0 |
| File Manager | 10 | 30 | ICON |

FIG. 3C

| Window Timing Function Parameters | | | | | |
|---|---|---|---|---|---|
| Window Timing Function | X ON | OFF | | | |
| Sampling Rate | 30 seconds | | | | |
| Inactivity Timeout | 5 minutes | | | | |
| Suspend Timing? | YES | X NO | | | |
| Save Window Function Data? | X YES | NO | | | |
| Reset Window Timing? | YES | X NO | | | |
| Tiling Area | ULx 0 | ULy 140 | LRx 200 | LRy 0 | |
| Proportional Tiling | X ON | OFF | | | |
| Best Fit | X ON | OFF | | | |
| Minimum Tiling Percentage | 5 Percent | | | | |

FIG. 4

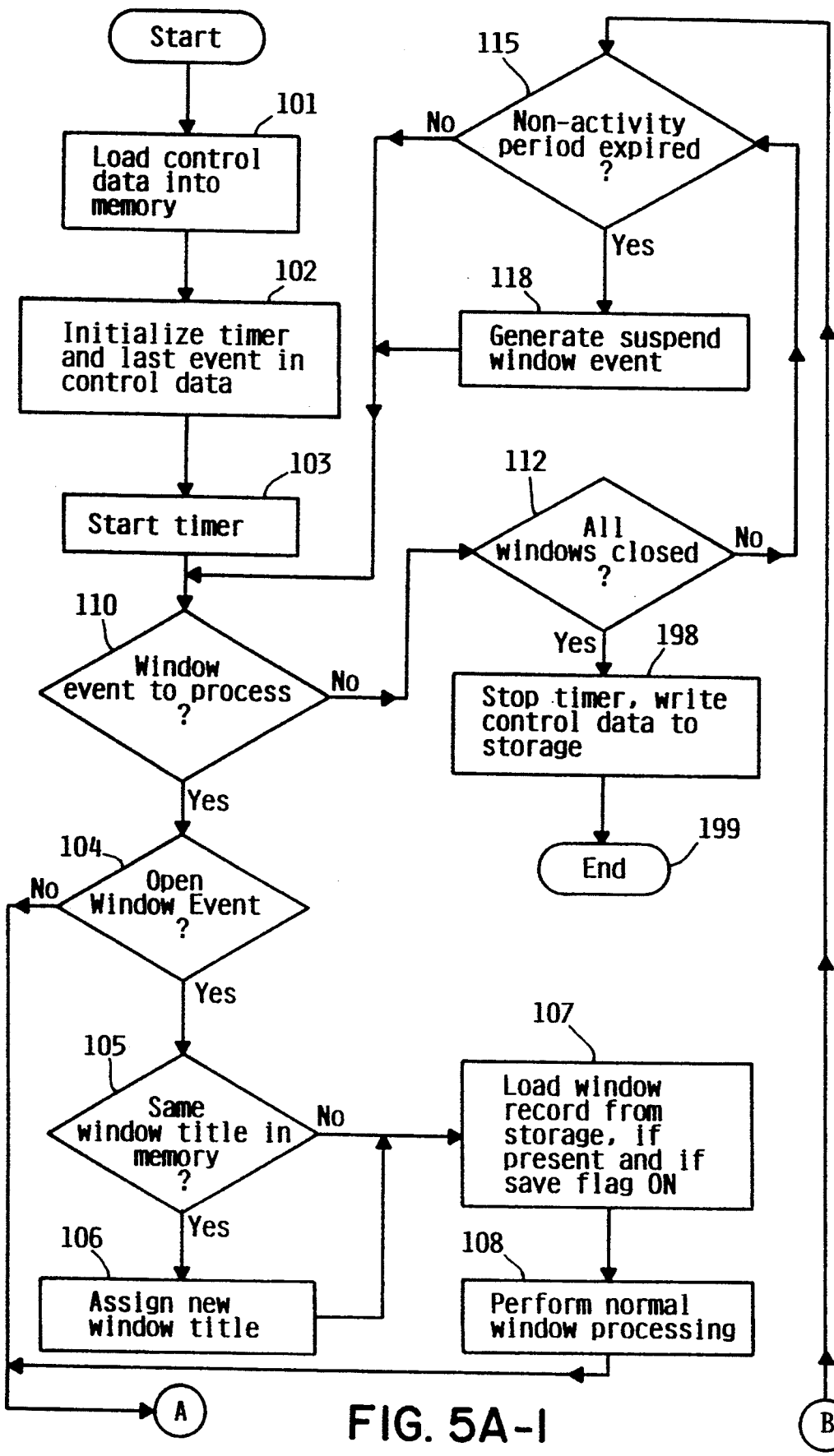
FIG. 5A-I

METHOD AND APPARATUS FOR PROPORTIONALLY DISPLAYING WINDOWS ON A COMPUTER DISPLAY SCREEN

FIELD OF THE INVENTION

This invention relates to the data processing field. More particularly, this invention relates to the proportional representation of windows on a computer display screen.

CROSS REFERENCE TO RELATED APPLICATIONS

Co-pending U.S. patent application entitled "Method and Apparatus for Distinctively Displaying Windows on a Computer Display Screen", Ser. No. 07/811,562, commonly assigned and filed on even date herewith is related to this patent application and is hereby incorporated by reference.

BACKGROUND OF THE INVENTION

Computer systems that use what is known as a "graphical user interface", first introduced to the market by Apple, and later adopted by Microsoft with its "Windows" program, and by IBM with OS/2 and Presentation Manager, are a fairly recent addition to the state of the art. One common feature of these graphical user interface systems is that a multitude of windows or viewports can be present simultaneously on the computer display screen. Different application programs can be running (or waiting for input from the user) concurrently in each of the windows displayed on the computer display screen. In addition, a single application program can generate many different windows. The user can use a mouse or other input device to move back and forth between different windows, thereby performing many different tasks.

While these graphical user interface systems offer many advantages over more conventional operating systems such as DOS (which can only run and display one application program at a time), this additional function has created new problems for the user. While graphical user interface systems offer the capability of presenting a nearly unlimited number of windows on a computer screen, this does not mean that these nearly unlimited number of windows can be displayed on a computer screen so they can be seen by a user. In fact, it is quite probable that the vast majority of these windows will be either partially or completely obscured by other windows. This problem can occur with as little as two windows, but is exasperated when many more windows than this are used.

When some of the windows are partially or completely obscured, it becomes very difficult for the user to successfully move back and forth between the various windows, since the user is unable to find many of them without a significant amount of effort. This limitation in graphical user interface systems tends to defeat the very purpose of having such a system by severely restricting the number of different tasks or application programs that can really be used concurrently and displayed or otherwise presented simultaneously via windows.

SUMMARY OF THE INVENTION

It is a principle object of the invention to enhance the operation of a graphical user interface system.

It is another object of the invention to provide a more efficient way for users to find partially or completely obscured windows.

It is another object of the invention to distinctively display windows on a computer display screen to assist users in finding partially or completely obscured windows.

It is another object of the invention to proportionally display windows on a computer display screen to assist users in finding partially or completely obscured windows.

These and other objects are accomplished by the method and apparatus for proportionally displaying windows on a computer display screen disclosed herein.

A method and apparatus for distinctively and proportionally displaying windows on a computer display screen is disclosed. The amount of time each of the windows presented to the display screen is active (also known as "in focus") is monitored. Upon receipt of a command from the user, the windows that were active a longer length of time are displayed more distinctively than windows that were active a shorter length of time. More specifically, windows are displayed on the display screen having a window size proportional to the length of time each of the window were active. For example, a window that was active 40% of the time will have a size that is 40% of the specified window tiling area. Windows that have not been active long enough to exceed a minimum window tiling threshold are displayed as icons outside of or under the specified window tiling area and are not included in the calculations of percentage of activity of the windows.

A list of windows is sorted in a descending order of activity $1-N$, where $N=$the number of windows. The window tiling area is first split into two regions—an H1 region and an H2 region. If the width of the window tiling area is greater than or equal to its height, this split is done vertically; otherwise, it is done horizontally. This split is performed so that the H1 region is proportional to the length of time the first and second windows were active relative to the length of time the first through Nth window were active, thereby making the H2 region proportional to the length of time the third through Nth window were active relative to the length of time the first through Nth window were active.

After this split is performed, the H1 region is split into a Q1 region and a Q2 region. If the width of the H1 region is greater than or equal to its width, this split is done vertically; otherwise, it is done horizontally. This split is performed so that the Q1 region is proportional to the length of time the first window was active relative to the length of time the first and second window was active.

After this split is performed, the H2 region is split into a Q3 region and a Q4 region. As before, if the width of the H2 region is greater than or equal to its width, this split is done vertically; otherwise, it is done horizontally. This split is performed so that the Q3 region is proportional to the length of time the third window was active relative to the length of time the third through Nth windows were active.

The first, second, and third most active windows are displayed in the Q1, Q2, and Q3 regions, respectively. If there are only four windows, the fourth window is displayed in the Q4 region. If there are more than four windows, the Q4 region is recursively split in the same manner as the window tiling area, H1 region, and the H2 region was split, if necessary. This splitting continues recursively until there is a region for displaying each window that was active long enough to exceed a minimum window tiling threshold.

BRIEF DESCRIPTION OF THE DRAWING

Figures 2D, 2E:
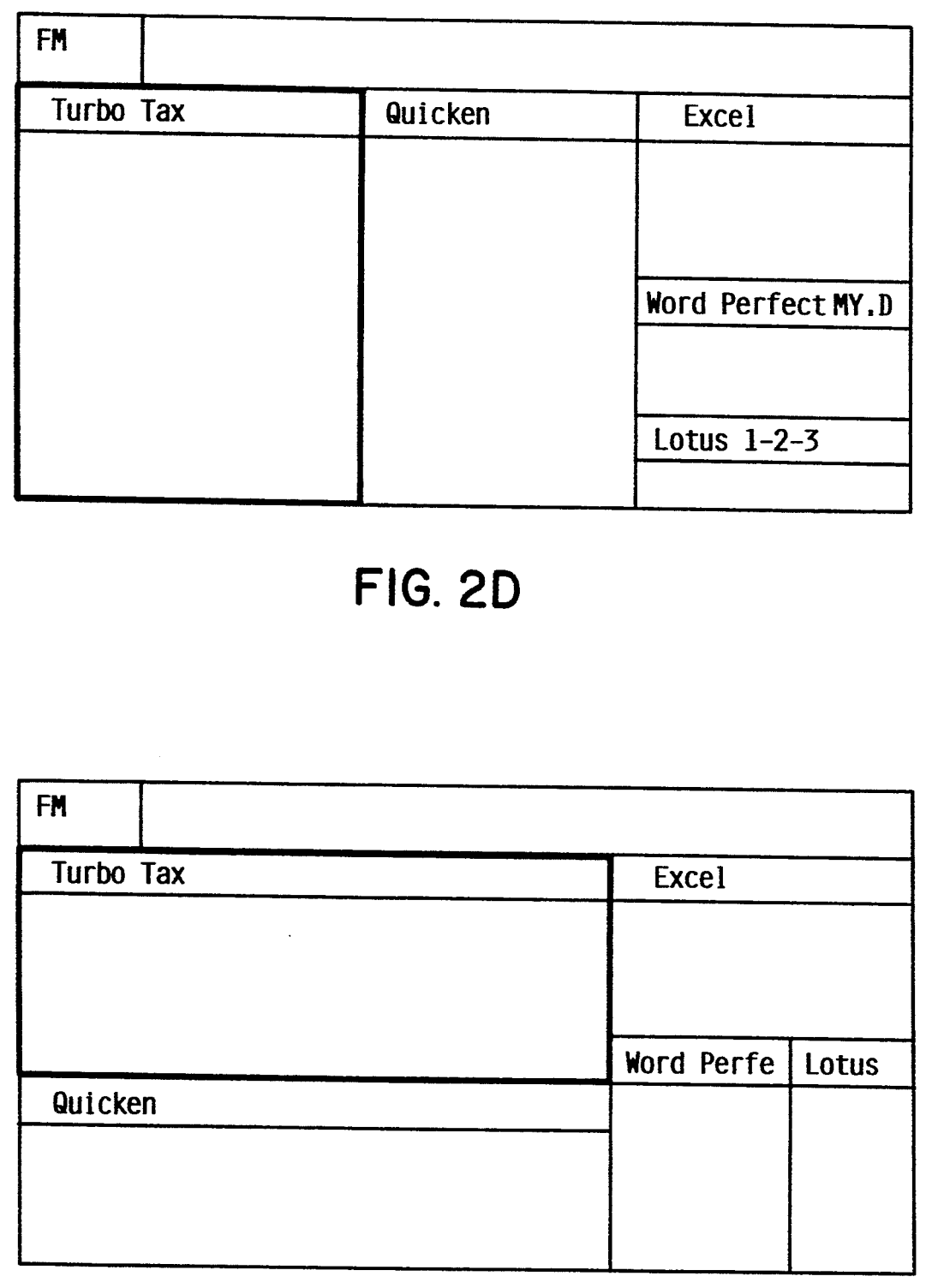

FIGS. 2C-1 through 2C-4 shows how the window tiling area of a display screen is split into regions according to the invention.

FIG. 2D shows how windows are displayed proportionally in the preferred embodiment of the invention.

FIG. 2E shows how windows are displayed proportionally in a first alternate embodiment of the invention.

FIG. 2F shows how windows are displayed distinctively but non-proportionally in a second alternate embodiment of the invention.

FIG. 2G shows how windows are displayed distinctively but non-proportionally in a third alternate embodiment of the invention.

FIG. 3A shows the control data of the invention.

FIG. 3B shows the window data of the invention prior to being sorted.

FIG. 3C shows the window data of the invention after being sorted.

FIG. 4 shows an exemplary screen used to set user modifiable parameters of the invention.

DESCRIPTION OF THE PREFERRED EMBODIMENT

Figure 1:
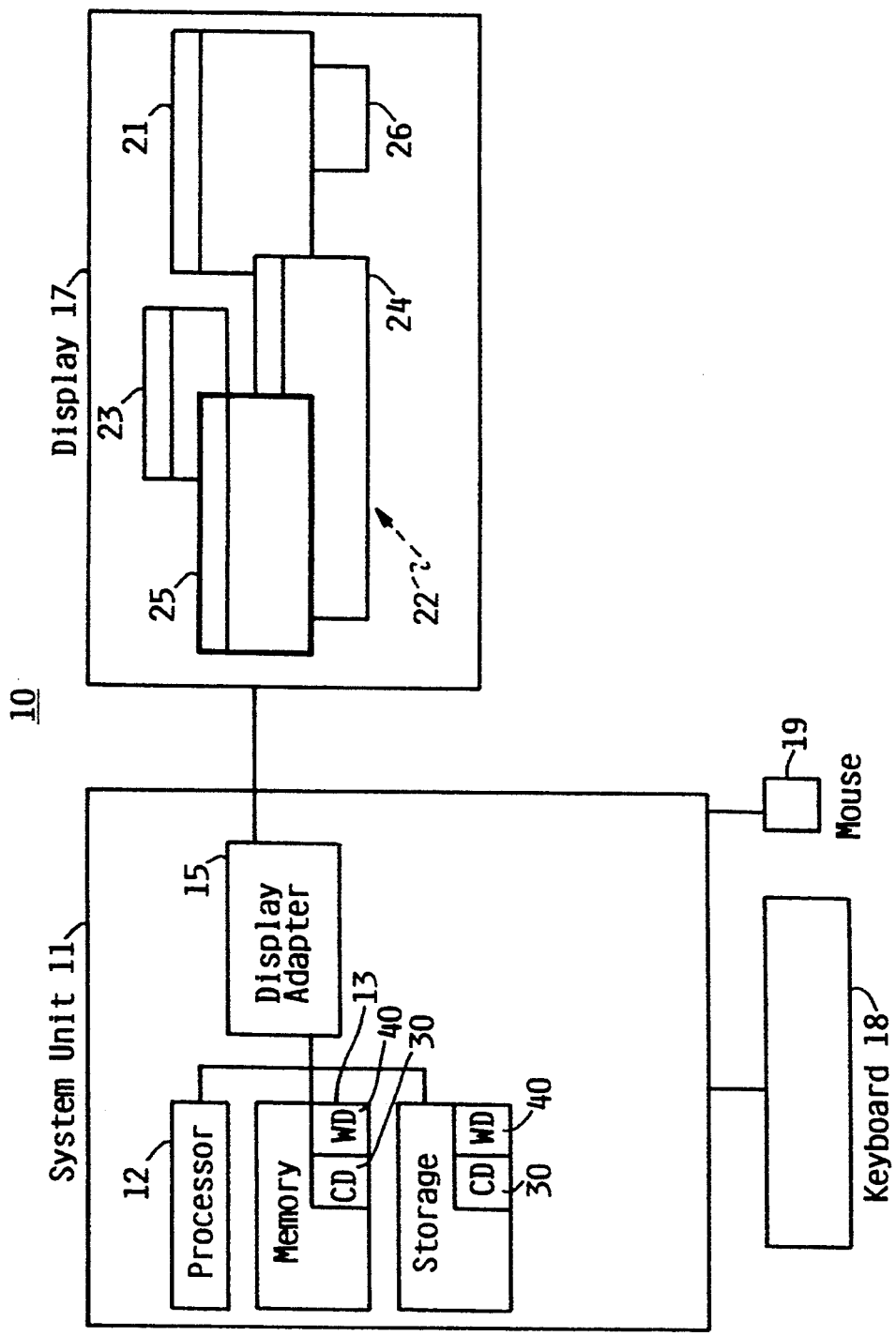
FIG. 1 shows a block diagram of the computer system of the invention.

FIG. 1 shows a block diagram of computer system 10 of the invention. Computer system 10 has display 17, keyboard 18, and input device 19, each of which is connected to system unit 11. System unit 11 contains processor 12 connected to memory 13, storage 14, and display adapter 15. Processor 12 is suitably programmed to carry out this invention, as described in more detail in the flowcharts of FIGS. 5-10. Storage 14 and memory 13 contains control data 30 and window data 40.

In the preferred embodiment, computer system 10 is an IBM PS/2, where processor 12 is an Intel 80386 microprocessor. Display adapter 15 is an IBM 8513 display adapter, and display 17 is an IBM 8513 display. Input device 19 is preferably an IBM mouse but may also be a track ball, light pen, or other input device. Disk 14 contains operating system software, preferably OS/2 with Presentation Manager but optionally Microsoft Windows 3.0, as well as preferably one or more OS/2 application programs such as WordPerfect for Presentation Manager or optionally DOS application programs such as Microsoft Word for Windows. When running, these programs are partially or completely installed in memory 13 and executed by processor 12.

Computer system 10 could also be another type of computer system, whether it be another microcomputer such as an Apple Macintosh, a minicomputer such as an IBM AS/400, or a mainframe computer such as an IBM 390, and still fall within the spirit and scope of this invention. In addition, computer system 10 can be a microcomputer such as described above, connected to a larger computer system such as an IBM AS/400.

Display 17 contains windows 21-26. For the purposes of this invention, a "window" or viewport can occupy anywhere from substantially all of the display screen to a very small portion of the display screen, and may be displayed in conjunction with other windows in a multi-tasking environment such as OS/2 or in a single-tasking environment such as DOS. As the number of windows increases, it becomes more likely that many windows will become partially or completely obscured by other windows, as is shown in display 17 of FIG. 1.

Figure 2A:
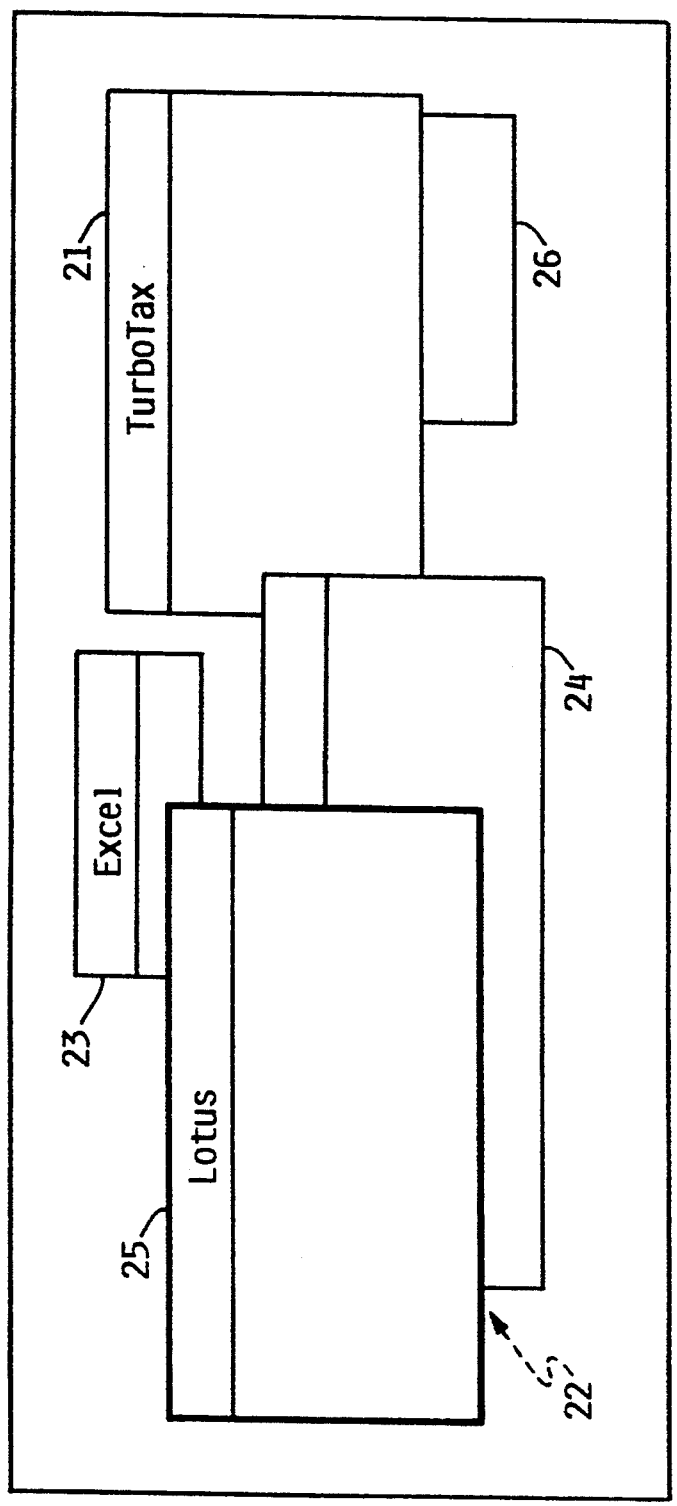
FIG. 2A shows how windows are displayed after a user has performed tasks on their computer for several minutes or hours.

FIG. 2A shows windows 21-26 on display 17 of FIG. 1 in more detail. FIG. 2A is exemplary of how a typical display screen might look after a user has performed tasks on their computer for several minutes or hours. Specifically, our user is using her computer to do some end of the year tax planning. While six windows are shown, anywhere from one to dozens of windows can be presented on a display screen. Note that window 25 has a darker border than the remainder of the windows and is not overlapped by any other window. This indicates to the user that window 25 is the active window, or is considered to be "in focus". When a window is "in focus", the user can input or otherwise manipulate the data contained in that window.

Windows 21, 22, 23, 24, and 26 are at least partially obscured by other windows. Window 22 is completely obscured. Windows 24 and 26 are almost completely obscured—little if any data contained in these windows is displayed to the user.

Our fictitious user, Tammy Taxpayer, started bright and early on a Saturday morning just before Christmas (she had finished her Christmas shopping in August) to do her end of the year tax planning. Tammy uses several application programs concurrently to help her with her tax planning. Tammy has spreadsheet data on Excel and Lotus, composes letters to the IRS and memos to her accountant on WordPerfect, has her financial information on Quicken, and enters in her tax data on TurboTax. She also is using an OS/2 application program known as File Manager, which assists Tammy in managing directories and other aspects of files on OS/2.

Tammy has jumped all around from window to window—a feature she particularly likes about Presentation Manager—and has most recently spent some time manipulating data in window 25 (i.e. using a spreadsheet on Lotus 1-2-3). But now Tammy wants to go back to the program she has used much of the morning—Quicken. Tammy quickly scans the display, only to discover that it is not readily apparent where the window that contains Quicken is! She can see enough of windows 21, 23, and 25 to know that these windows do not contain Quicken. But Quicken could be in either partially obscured windows 24 or 26, or in completely obscured window 22. Tammy could use trial and error and look in each window (by moving the mouse pointer over to the obscured window and double clicking a mouse button to make the window active), but this technique is quite cumbersome and does not work when there are many windows on the screen, or when one or more windows are completely obscured.

Fortunately for Tammy, her computer system is computer system 10 of this invention. Therefore, she has the ability to rapidly resize her windows so that they are displayed in a size proportional to the length of time they were active, or "in focus". As will be discussed in more detail later, processor 12 of computer system 10, suitably programmed to execute the flowcharts of FIGS. 5-10, monitors the amount of time each of the windows presented to the display screen is active, or "in focus". When Tammy selects the display window tiling mode, the windows that were active a longer length of time are displayed more distinctively than windows that were active a shorter length of time. The actual manner in which active windows are displayed more distinctively is dependent on the parameters Tammy selects for the display window tiling mode.

If Tammy enables the proportional and best fit parameters of the window display tiling mode, she is using the preferred embodiment of the invention, and display screen 17 appears as is shown in FIG. 2D. Computer system 10 has been monitoring Tammy's activity since she started using the computer today, and knows that she has used TurboTax 40% of the time, Quicken 35% of the time, Excel 10% of the time, WordPerfect 7% of the time, Lotus 1-2-3 5% of the time, and File Manager 3% of the time. Computer system 10 splits up the specified window tiling area into regions that are proportional to the amount of time each of the windows has been active, as is shown in FIG. 2C-1 to 2C-4. Since the best fit parameter was enabled, each segment is split vertically if the width of the segment is greater than or equal to the height of the segment; otherwise, the segment is split horizontally. File Manager is not shown as a window since it did not exceed the specified minimum threshold window size of 5%. Therefore, File Manager is displayed as an icon outside the window tiling area. The time File Manager was active is ignored when determining the size of the proportional regions of the other windows.

If Tammy enabled the proportional parameter but did not enable the best fit parameter, she is using a first alternate embodiment of the invention, and display screen 17 appears as is shown in FIG. 2E. As before, Computer system 10 splits up the specified window tiling area into regions that are proportional to the amount of time each of the windows has been active. Since the best fit parameter was not enabled, the first segment is split vertically, subsequent "child" regions are split horizontally, then vertically and so on until the window tiling area has been split into the required number of regions. As before, File Manager is displayed as an icon outside the window tiling area.

If Tammy did not enable the proportional parameter but did enable the best fit parameter, she is using a second alternate embodiment of the invention, and display screen 17 appears as is shown in FIG. 2F. Unlike before, Computer system 10 splits up the specified window tiling area into four equal regions. Since the best fit parameter was enabled, each segment is split vertically if the width of the segment is greater than or equal to the height of the segment; otherwise, the segment is split horizontally. As before, File Manager is displayed as an icon outside the window tiling area.

If Tammy did not enable the proportional parameter and did not enable the best fit parameter, she is using a third alternate embodiment of the invention, and display screen 17 appears as is shown in FIG. 2G. Computer system 10 splits up the specified window tiling area into four equal regions. Since the best fit parameter was not enabled, the first segment is split vertically, the second horizontally, and so on until the window tiling area has been split into the required number of regions. As before, File Manager is displayed as an icon outside the window tiling area.

While English speaking cultures would consider the left to right organization of windows as shown in FIGS. 2D–2G to be an optimal way of organizing windows in the order of desired distinctiveness, whether proportionally sized or not, other cultures may prefer a right to left approach. As will be seen later, the invention can be modified slightly to accommodate these cultural differences.

FIG. 3A shows control data 30 of FIG. 1 in more detail. In the preferred embodiment, control data 30 is stored in storage 14 and read into memory 13, as will be discussed later. Control data 30 contains information used and updated by the flowcharts of FIGS. 5–10 to perform the window timing function of the invention.

ON/OFF flag 31 keeps track of whether the window timing function of the invention is on or off. Timer 32 keeps track of the value of the current system timer. In the preferred embodiment, timer 32 is a nine digit value that expresses the number of time periods (as determined by sampling rate 33) that have elapsed since the timer was started or reset. Suspend flag 34 keeps track of whether the window timing function has been suspended, as will be discussed in more detail later. Last event flag 36 is used to monitor the user's activity. This data is used to check for a situation where a window is in focus for a long period of time but there is no activity coming from the user (i.e. coffee break, etc) and to automatically suspend the window timing function when a specified inactivity timeout period has elapsed. Inactivity timeout flag 37 contains the specified inactivity timeout period. Save flag 38 keeps track of whether the user wants window data 40 to be saved.

Figure 2B:
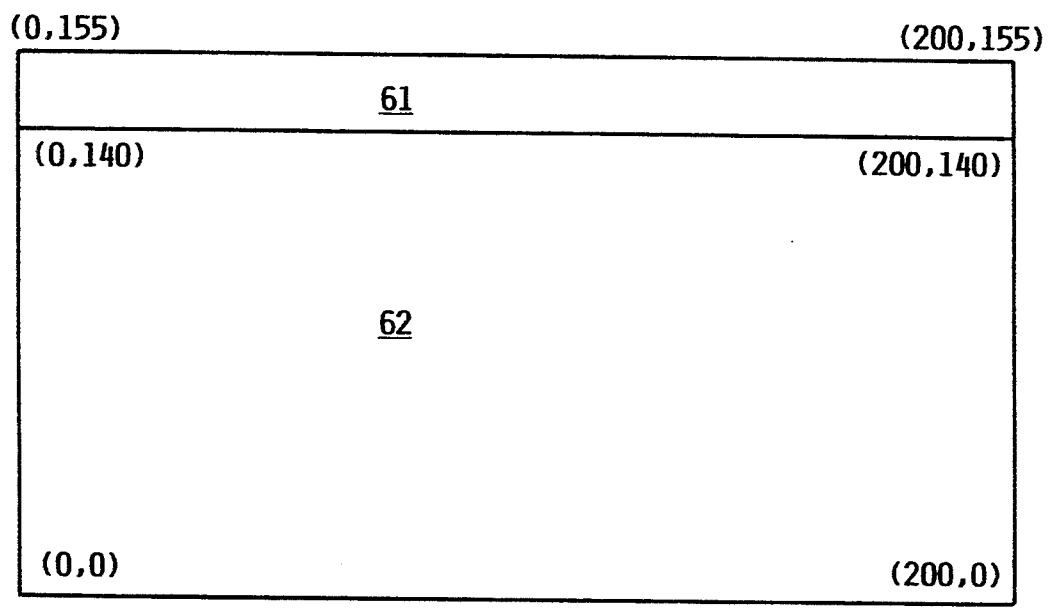
FIG. 2B shows how the rows and columns of a display screen can be mapped into x and y coordinates.

Tiling area field 51 indicates the area of the screen reserved for window tiling operations. The first two numbers indicate the x and y coordinates of the upper left corner of the tiling area, where the lower left corner of the display screen is (0,0), as is shown in FIG. 2B. Of course, another origin point other than the lower left corner could be selected. The last two numbers indicate the x and y coordinates of the lower right corner of the tiling area. In the preferred embodiment, these coordinates are measured in millimeters instead of characters, so a proper aspect ratio between height and width of the display can be maintained. Other units of measure such as pixels, could also be used. In the preferred embodiment, display 17 is an IBM 8513 display having a display area approximately 200 mm wide and 155 mm high. Therefore, the x,y coordinates of the upper left corner of this display area is (0,155), and the x,y coordinates of the lower right corner is (200,0). In our example screen shown in FIG. 2B, tiling area 62 is shown having upper left corner 63 coordinates of (0,140), and lower right 64 coordinates of (200,0). Therefore, tiling area field 51 of control data 30 will contain the following: 0,140,200,0. Non-tiling area 61 is reserved on the display screen for icons and other non-tiling uses.

Field 52 contains an indication whether proportional tiling is ON or OFF. If field 52 is on, the invention splits up the tiling area proportionally based on the length of time the windows were active. If field 52 is OFF, the invention splits up the tiling area into four equal quadrants, and then recursively splits up the fourth quadrant until there is one region for each window that exceeds the minimum tiling percentage. In the preferred embodiment, this field is ON.

Field 53 contains an indication whether best fit is ON or OFF. If field 53 is ON, the invention splits up a segment vertically if the width of the segment is greater than or equal to the height, and splits up a segment horizontally if the width of the segment is less than the height. If field 53 is OFF, the invention alternates between splitting up a segment vertically and horizontally. In the preferred embodiment, this field is ON.

Field 54 contains an indication of the minimum tiling percentage. Windows that have been active less than the minimum tiling percentage are displayed as icons instead of windows. This is done so that windows do not become so small that they are unreadable or unusable. For example, if a window has been active for 30 timer periods out of 1000 timer periods (or 3% of the time), this window will be displayed as an icon if a minimum tiling percentage of 5% is specified in field 54. Note that icons are displayed outside the window tiling area, either in another available space on the screen, or under the window tiling area if there is no available space.

FIG. 3B shows window data 40 of FIG. 1 in more detail. In the preferred embodiment, window data 40 is stored in storage 14 at the option of the user and read into memory 13, as will be discussed later. Window data 40 contains information used and updated by the flowcharts of FIGS. 5-10 to perform the window timing function and window tiling function of the invention. Window data 40 is arranged in columns 41-44. Each open window that has been active at some point of time when the window timing function of the invention has been on is contained in window data 40 in memory 13. Column 41 contains the title or other identifier of these windows. Column 42 contains the value of timer 32 the last time that each of the windows was put in focus. Column 43 contains the total number of time periods that each of the windows in window data 40 have been in focus. Column 44 contains the x,y coordinates of the upper left and lower right corners of the windows to be displayed, as determined by the flowcharts of FIGS. 8-9.

FIG. 3C shows window data 40 after it has been sorted in descending order of activity.

Figures 1, 2C:
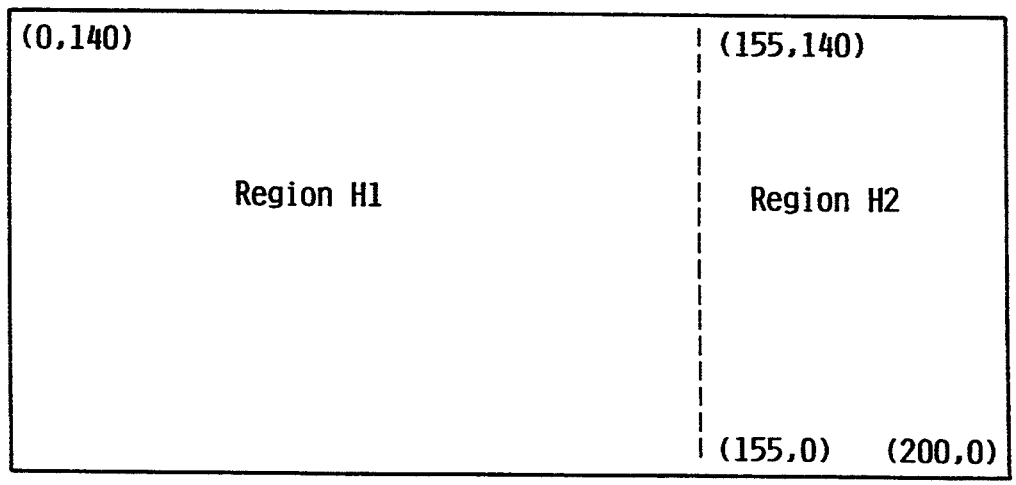
Figures 2, 2C:
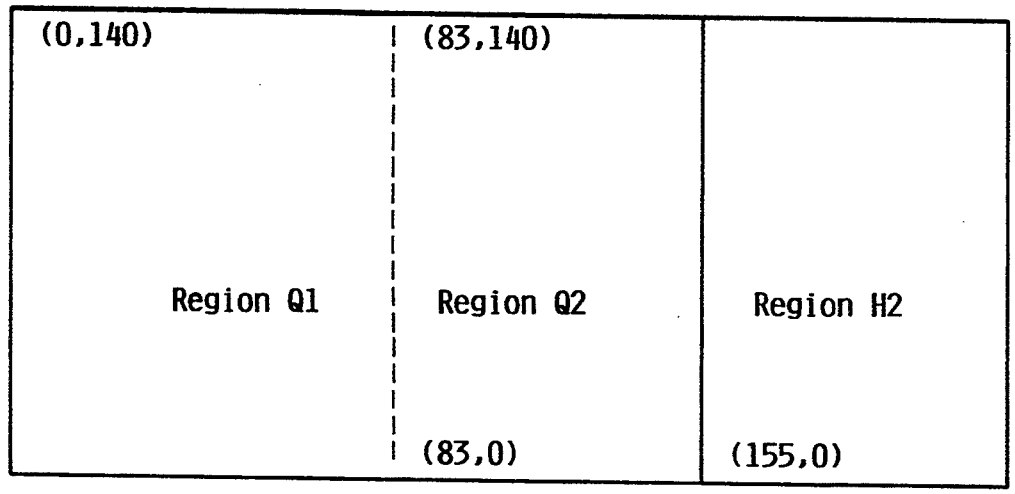
Figures 2, 2C, 3:
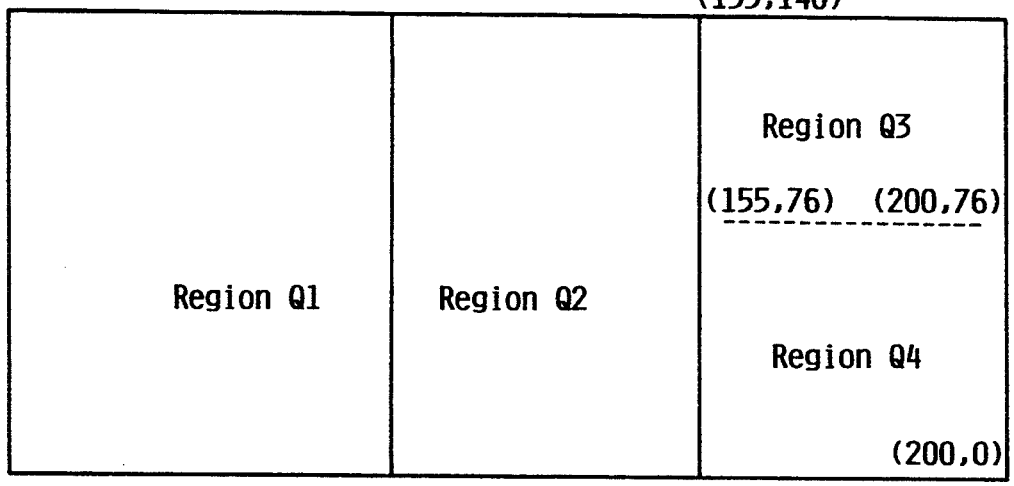
Figures 2, 2C, 3, 4:
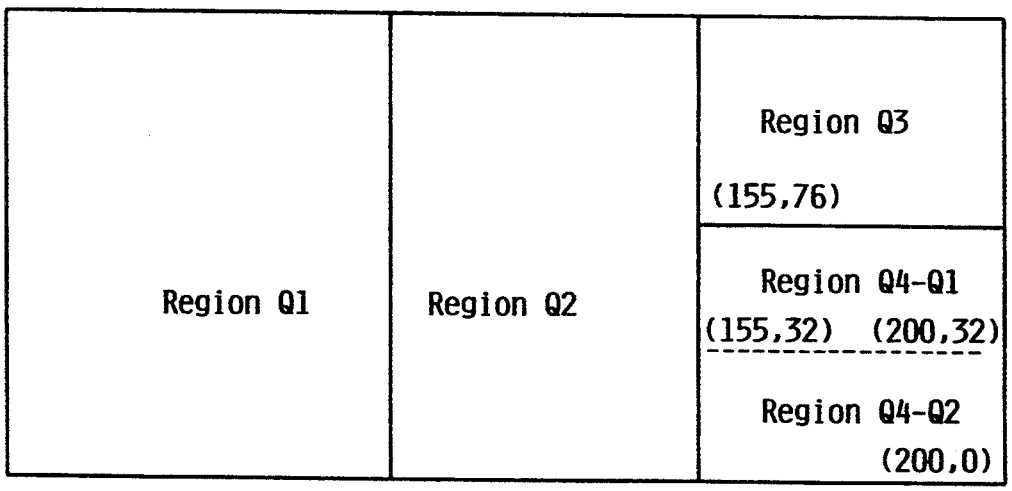

FIG. 4 shows the window timing function parameters. These parameters are normally assigned default values, but can be presented to the user upon demand for possible modifications. The first parameter asks whether the window timing function should be on or off. There may be instances where the user would prefer that the windows operate in a more conventional fashion. The next parameter is the sampling rate. This allows the user to control the level of granularity of the window timing function. The next parameter specifies the inactivity timeout period. The next parameter asks if a user wants to suspend window timing. This parameter can be selected via the screen shown in FIG. 4, or a special key sequence can be set up to toggle this parameter on or off. This parameter could be quite useful to minimize the effects of bathroom breaks or other interruptions. The next parameter asks if window data 40 created during this computing session should be saved for the next computing session. If so, window data 40 is written from memory 13 to storage 14 as a window is closed. The next parameter asks whether window timing should be reset. It may be desirable to "start over" in the middle of a computing session, especially if the user is now performing a completely unrelated task to what was done previously. If the user specifies that the window timing should be reset, all windows start fresh as if they have not been active during this session.

The next parameter prompts the user for the x,y coordinates of the upper left and lower right corners of the desired tiling area. The next parameter asks whether proportional tiling should be on or off. The next parameter asks whether best fit should be on or off. The last parameter allows the user to specify a minimum tiling percentage.

Figures 2, 5A:
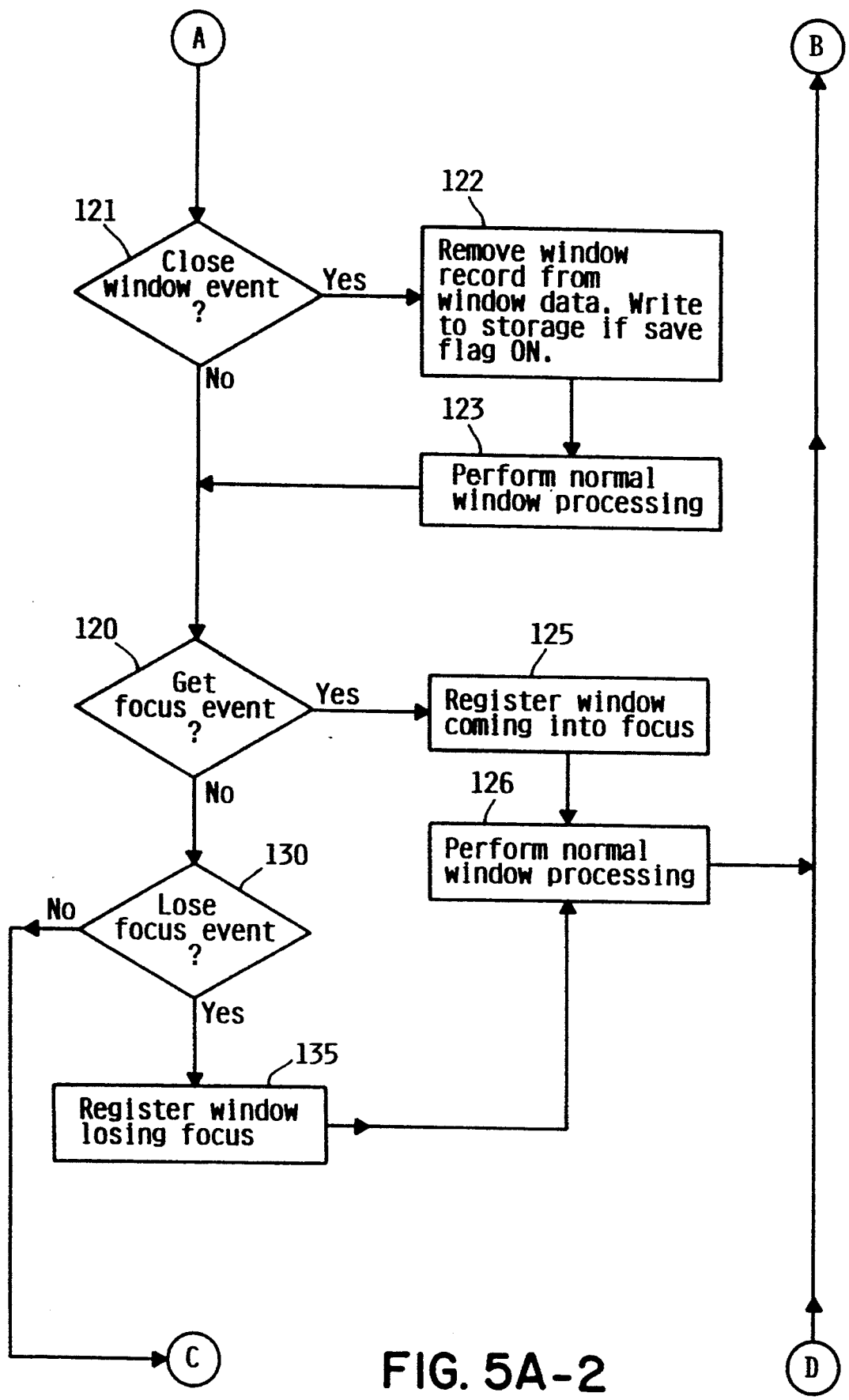
Figures 1, 5B:
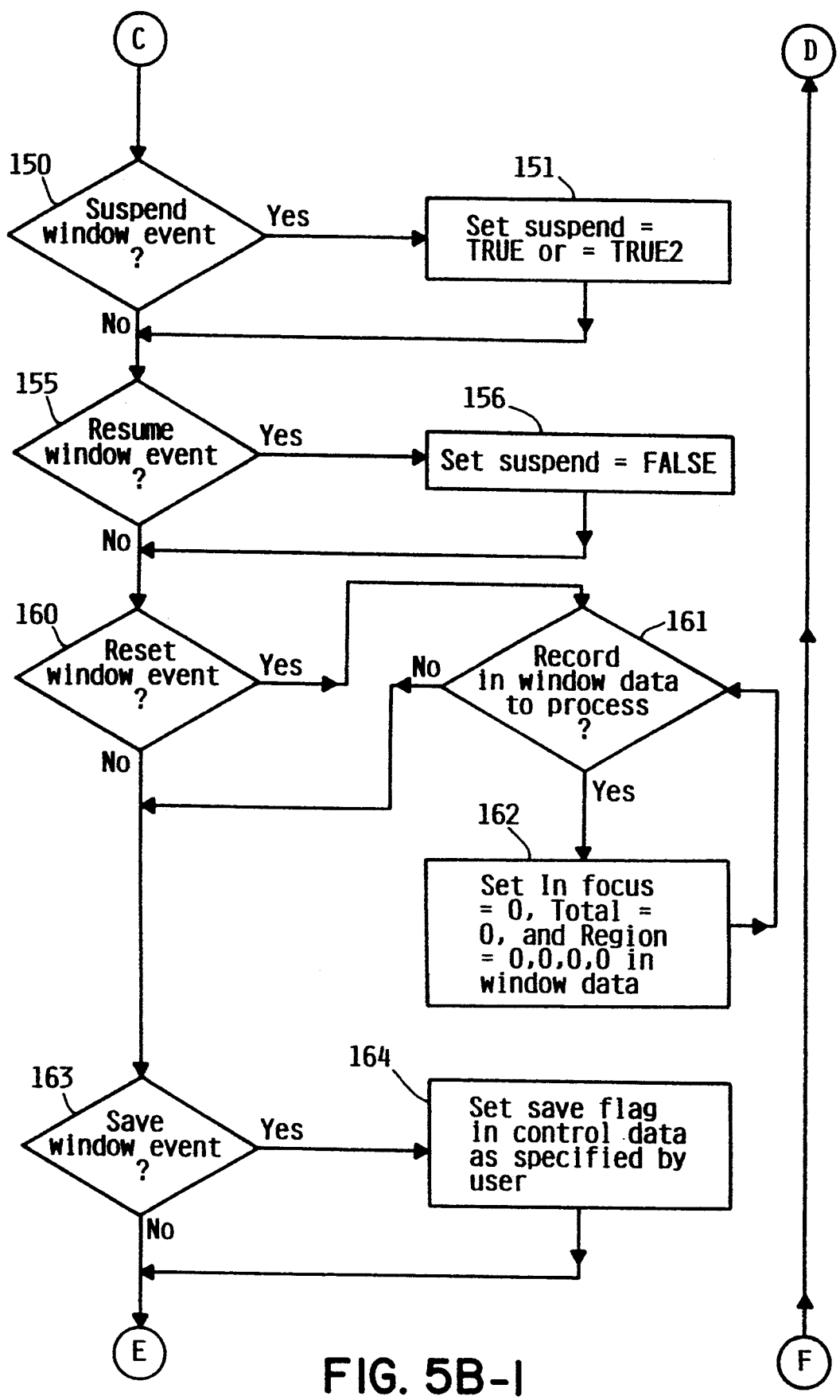
Figures 2, 5B:
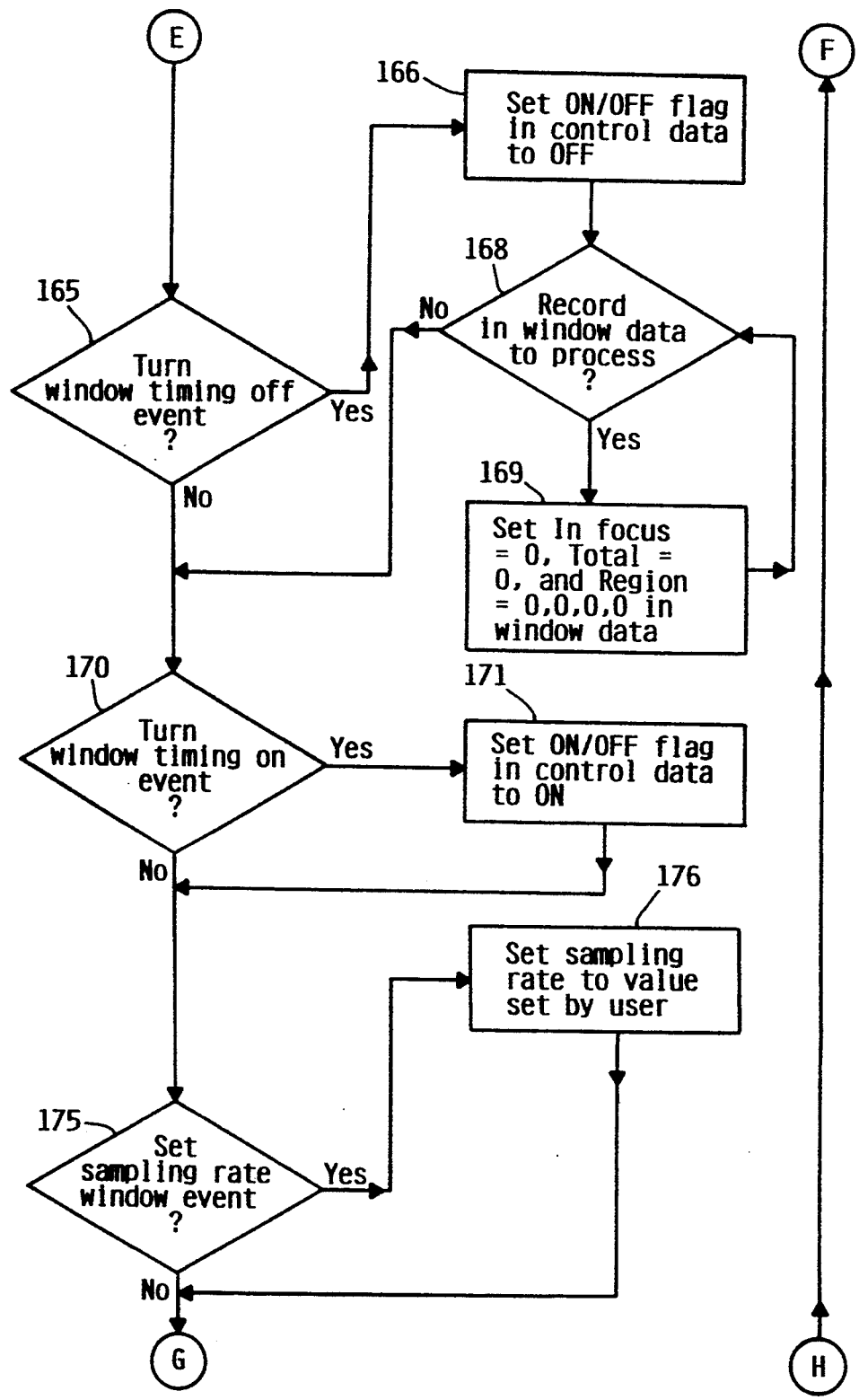
Figure 5C:
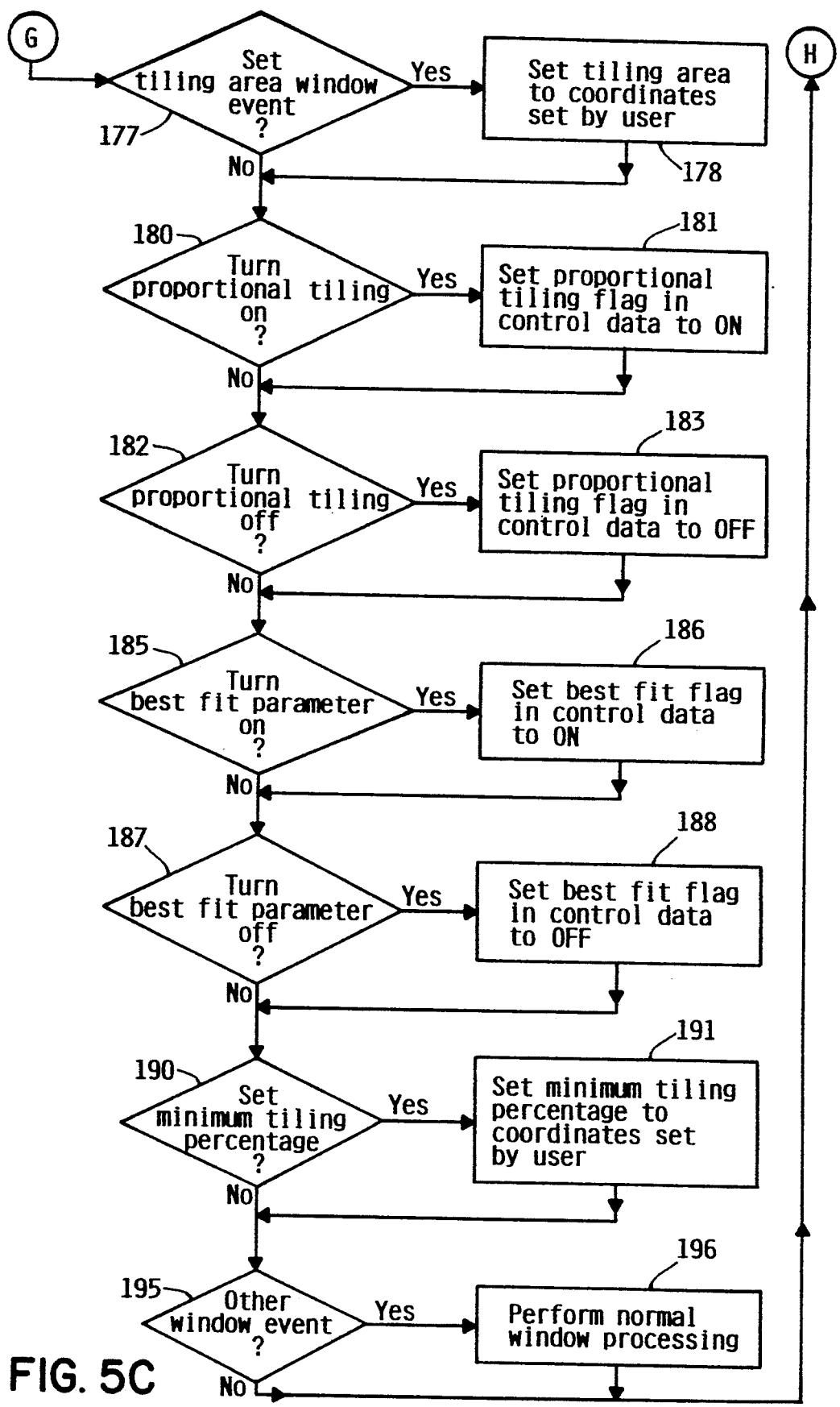
FIGS. 5-10 show the flowcharts of the invention.
Figure 6:
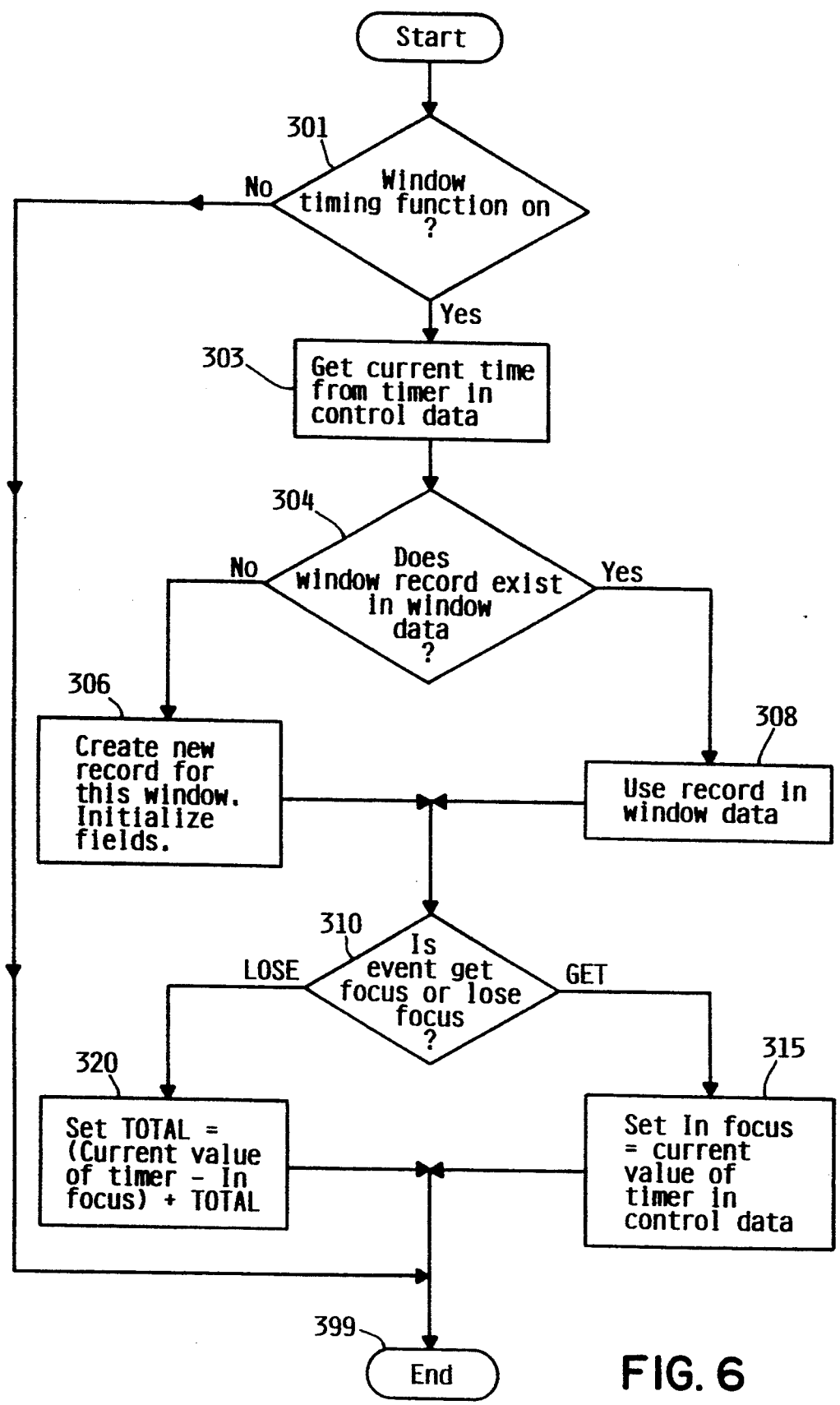
Figure 7:
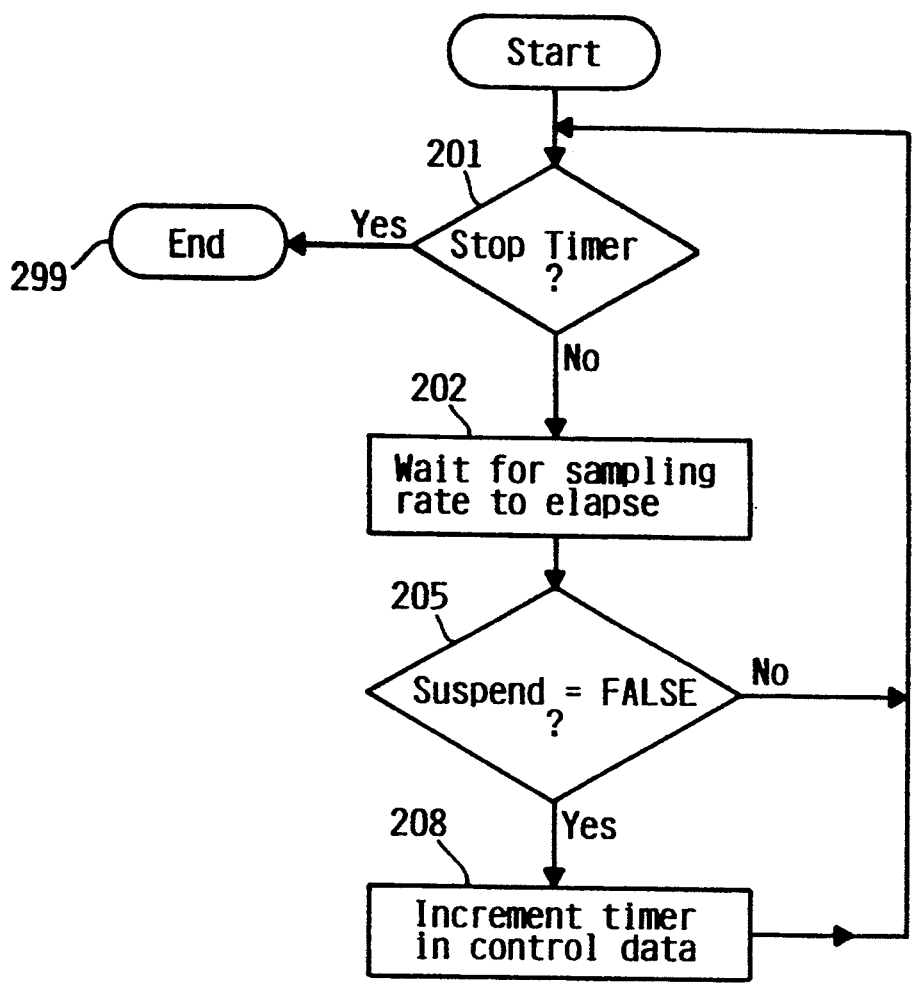

The operation of this invention, as shown in the flowcharts of FIGS. 5-10, will now be described in more detail. Referring now to FIG. 5, block 101 loads control data 30 from storage 14 to memory 13. Block 102 initializes timer 32, and last event flag 36 in control data 30. Block 103 starts timer 32. This is done by initiating the execution of the flow chart of FIG. 7. Referring now to FIG. 7, block 201 asks if it has received any indication to stop the timer from block 198 of FIG. 5A. If so, the program ends in block 299. If not, block 202 waits for sampling rate 33 in control data 30 to elapse. Block 205 checks to see if suspend flag 34 in control data 30 is FALSE. If this flag is not false (either TRUE or TRUE2 in the preferred embodiment), this is an indication that window timing should be suspended. This condition could exist if the user indicated that she wanted to suspend sampling, or if the inactivity timeout period had expired, as will be discussed in more detail later. If not, flow of control loops back to block 201. If block 205 indicates that suspend is FALSE, block 208 increments timer 32 in control 30 by one to indicate one more timer period has elapsed.

Referring again to FIG. 5A, after block 103 starts the timer, block 110 checks to see if there is a window event to process. In the preferred embodiment, a "window event" is any event generated by Presentation Manager, such as entering data into a window, moving either a text cursor or a mouse cursor, clicking on a scroll bar, etc, as well as events generated by this invention. If block 110 is answered negatively, block 112 checks to see if all windows have been closed. If so, block 198 stops timer 32 and writes control data 30 to storage 14, if save flag 38 is ON. The program then ends in block 199. If block 112 indicates that all windows have not been closed, block 115 checks to see if inactivity timeout period 37 in control data 30 has elapsed. This is done by subtracting last event 36 from timer 32, multiplying the result by sampling rate 33, and dividing by 60. If this result is greater than the value in inactivity timeout 37, block 115 is answered affirmatively, and block 118 automatically generates a suspend window event. In either event, flow of control goes back to block 110.

When block 110 indicates that there is a window event to process, block 104 checks to see if this is an open window event. If so, block 105 checks to see if a window having the same name is already in memory 13. If so, this window is given a new name (i.e., Turbo Tax 2) in block 106. In either event, block 107 loads this window in record from storage 14 to memory 13, if any such data was saved from a previous session, and if save flag 38 is on. Normal window processing is then performed in block 108.

Block 121 checks to see if this was a close window event. If so, it is appropriate to remove the window from window data 40 in memory 13 so that it does not reappear when the user selects a window display mode. This function is done by block 122. Block 122 also writes this window record to storage 14 if save flag 38 is ON. Block 123 then performs normal window processing for this event.

If block 121 is answered negatively, block 120 asks whether this event is a get focus event. In the preferred embodiment, a "get focus" event is generated by Presentation Manager whenever a window is made active, or put "in focus". If block 120 is answered affirmatively, block 125 registers the window coming into focus. This registration is done by activating the flowchart of FIG. 6.

Referring now to FIG. 6, block 301 checks to see if ON/OFF flag 31 in window data 30 is ON. If not, the program ends immediately in block 399. If this flag is ON, block 303 gets the current time from timer 32 in control data 30. Block 304 checks to see whether the window to be put in focus exists in window data 40. If not, block 306 creates a new record for this window in window data 40. Zeros are placed in In focus column 42, total column 43, and region column 44. If block 304 is answered negatively, block 308 uses the window record associated with this window to be put in focus in window data 40.

Block 310 asks whether this is a "get focus" window event or a "lose focus" window event. Since our event is a "get focus" event, block 315 puts the current value of timer 32 from control data 30 into In focus column 42 for this window, and the program ends in block 399.

Referring again to FIG. 5A, after block 125 registers the window coming into focus by activating the flowchart of FIG. 6, block 126 performs the normal window processing for this event. In the preferred embodiment, Presentation Manager puts the selected window in focus.

If block 120 is answered negatively, block 130 asks if this is a lose focus window event. In the preferred embodiment, a "lose focus" event is generated by Presentation Manager whenever a window is no longer active because another window has been put in focus. If block 130 is answered affirmatively, block 135 registers the window losing focus. This registration is done by again activating the flowchart of FIG. 6, as has already been discussed, except that block 310 (FIG. 6) determines that this is a lose focus event, and block 320 is executed instead of block 315. Block 320 updates the value in total column 43 of window data 40 for this window to indicate how long it was active. The value contained in In focus column 42 for this window is subtracted from the current value of timer 32 in control data 30. This result is added to the current value in total column 43 for this window, and the sum is placed in total column 43 for this window.

Referring again to FIG. 5A, after block 135 registers the window losing focus by activating the flowchart of FIG. 6, block 136 performs the normal window processing for this event. In the preferred embodiment, Presentation Manager takes the focus away from the de-selected window.

If block 130 is answered negatively, block 150 (FIG. 5B) checks to see if a suspend window event has been generated. This event could be generated either by block 118 of FIG. 5A (timeout period expired), or if the user indicated that timing should be suspended in her menu in FIG. 4. If the event was generated by the user, block 151 sets suspend flag 34 in control data 30 to be TRUE. If the event was generated by block 118, block 151 sets suspend flag 34 in control data 30 to be TRUE2. In either case, this will result in block 205 of independently executing flowchart FIG. 7 to be answered negatively, thereby skipping block 208.

Referring again to FIG. 5B, If block 150 is answered negatively, block 155 checks to see if a resume window event has been generated. This event could be generated either by block 1050 of FIG. 10 (timeout period expired, but user has now performed a window event that was caused by a user action) or if the user indicated that timing should be suspended in her menu in FIG. 4. In either case, block 156 sets suspend flag 34 in control data 30 to be FALSE. This will result in block 205 of independently executing flowchart FIG. 7 to be answered affirmatively, thereby executing block 208.

Referring again to FIG. 5B, if block 155 is answered negatively, block 160 checks to see if a reset window event has been generated. This event is generated if the user indicated that timing should be reset in her menu in FIG. 4. Block 161 loops through all the windows in window data 40, and block 162 sets all the values of In focus column 42, total column 43, and region column 44 to zero. When there are no more window records in window data 40 to process, block 161 is answered negatively, and flow of control moves to block 163.

Block 163 checks to see if a save window event has been generated. This event is generated if the user changed the value for the save parameter in her menu in FIG. 4. If a change was made block 164 sets save flag 38 in control data 30 to be either ON or OFF as specified by the user.

Block 165 checks to see if a turn window timing off event has been generated. This event is generated if the user indicated that window timing should be turned off in her menu in FIG. 4. If so, block 166 sets ON/OFF flag 31 in control data 30 to be OFF. Block 168 loops through all the windows in window data 40, and block 169 sets all the values of In focus column 42 and total column 43 to zero. When there are no more window records in window data 40 to process, block 168 is answered negatively, and flow of control moves to block 170.

Block 170 checks to see if a turn window timing on event has been generated. This event is generated if the user indicated that window timing should be turned on in her menu in FIG. 4. If so, block 171 sets ON/OFF flag 31 in control data 30 to be ON. In either event, flow of control moves to block 175.

Block 175 checks to see if a set sampling rate window event has been generated. This event is generated if the user filled in a value for the sampling rate in her menu in FIG. 4. If so, block 176 sets sampling rate field 33 in control data 30 to the value set by the user.

Block 177 checks to see if a define tiling area window event has been generated. This event is generated if the user filled in x,y coordinates of the upper left and lower right corners of the tiling area in her menu in FIG. 4. If so, block 178 inputs the tiling area coordinates to field 51 of control data 30 to the values set by the user.

Block 180 checks to see if an enable proportional tiling window event has been generated. This event is generated if the user indicated that the proportional tiling parameter of window tiling mode should be turned on in her menu in FIG. 4. If so, block 181 sets proportional tiling flag 52 in control data 30 to be ON.

Block 182 checks to see if a disable proportional tiling window event has been generated. This event is generated if the user indicated that the proportional tiling parameter of window tiling mode should be turned off in her menu in FIG. 4. If so, block 183 sets proportional tiling flag 52 in control data 30 to be OFF.

Block 185 checks to see if an enable best fit window event has been generated. This event is generated if the user indicated that the best fit parameter of window tiling mode should be turned on in her menu in FIG. 4. If so, block 186 sets best fit flag 53 in control data 30 to be ON.

Block 187 checks to see if a disable best fit window event has been generated. This event is generated if the user indicated that the best fit parameter of window tiling mode should be turned off in her menu in FIG. 4. If so, block 183 sets best fit flag 53 in control data 30 to be OFF.

Block 190 checks to see if a set minimum tiling percentage window event has been generated. This event is generated if the user filled in a value for the minimum tiling percentage in her menu in FIG. 4. If so, block 191 sets minimum tiling percentage field 54 in control data 30 to the value set by the user.

Block 195 checks to see if there is another window event to process. If so, block 196 performs conventional window processing for this event. In either event, flow of control loops back to block 115 of FIG. 5A.

Figure 8:
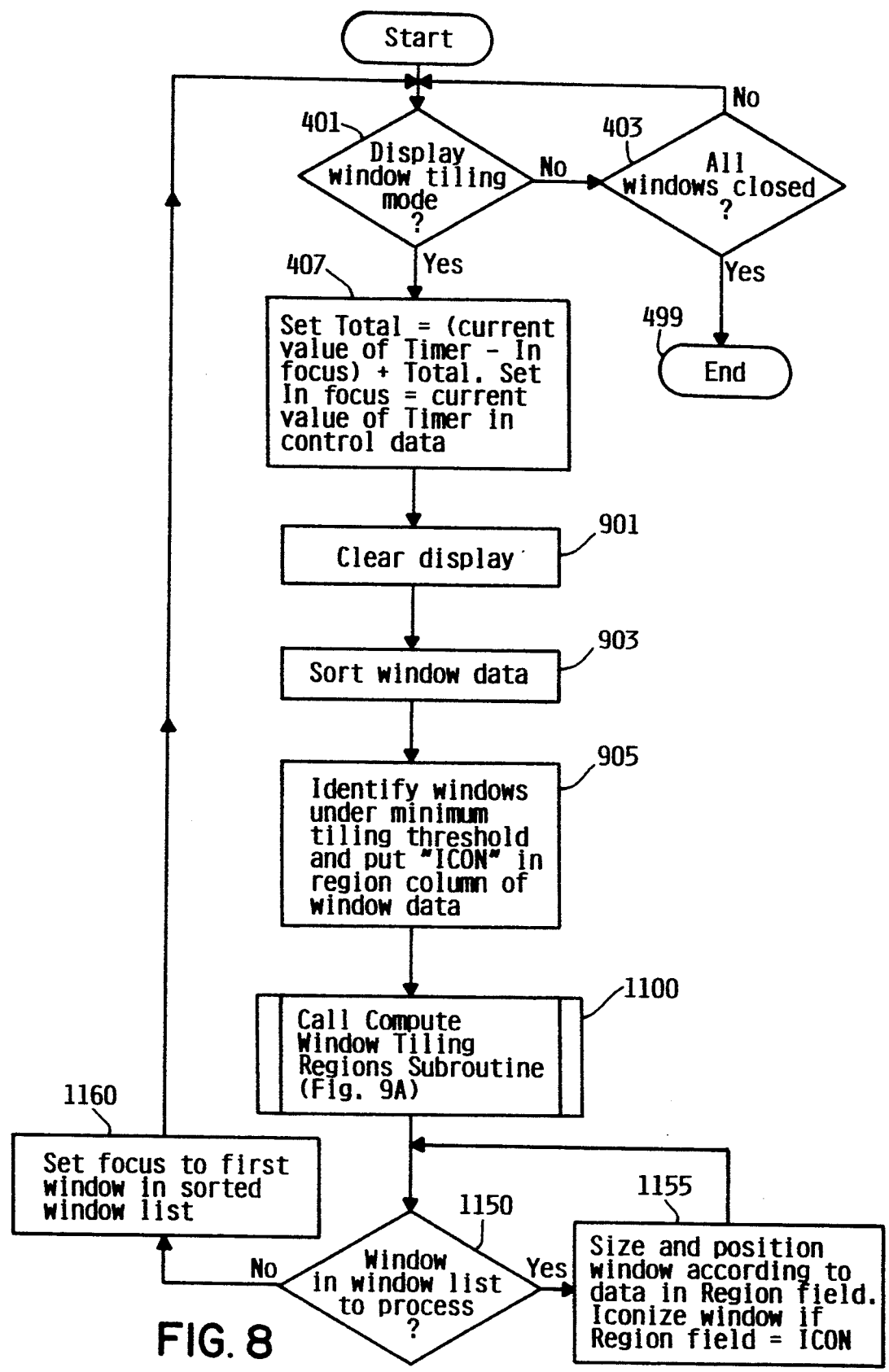

While the flowcharts of FIGS. 5A–5B and FIG. 7 are independently executing, the flowchart of FIG. 8 is also independently executing inside processor 12. This flowchart monitors user input to see if the user wants to rearrange her windows using the window timing function of this invention, as shown in FIGS. 2D–2G. Referring now to FIG. 8, block 401 checks to see if the user has selected the display window tiling mode. If block 401 determines that display window tiling mode has not been selected, block 403 checks to see if all windows have been closed. If so, the program ends in block 499. If not, the program loops back to block 401 to again check to see if display window tiling mode has been selected. In the preferred embodiment, display window tiling mode is selected through a specified key sequence. For example, ALT-W may be used. Alternatively, a combination of mouse buttons could be used, or the user could select the mode from a menu or by clicking on an icon or representation of a button on the display screen. In any event, as soon as block 401 determines that display window tiling mode has been selected, block 407 sets Total column 43 for the window currently in focus equal to the current value of timer 32 minus the value in in focus column 42, and adds this result to the valve currently in Total column 43. This function is the same as is performed by block 320 of FIG. 6, and assures that the most up to date information about the window currently in focus is used. Block 407 also sets in focus column 42 for this window equal to the current value of timer 32.

Figure 9A:
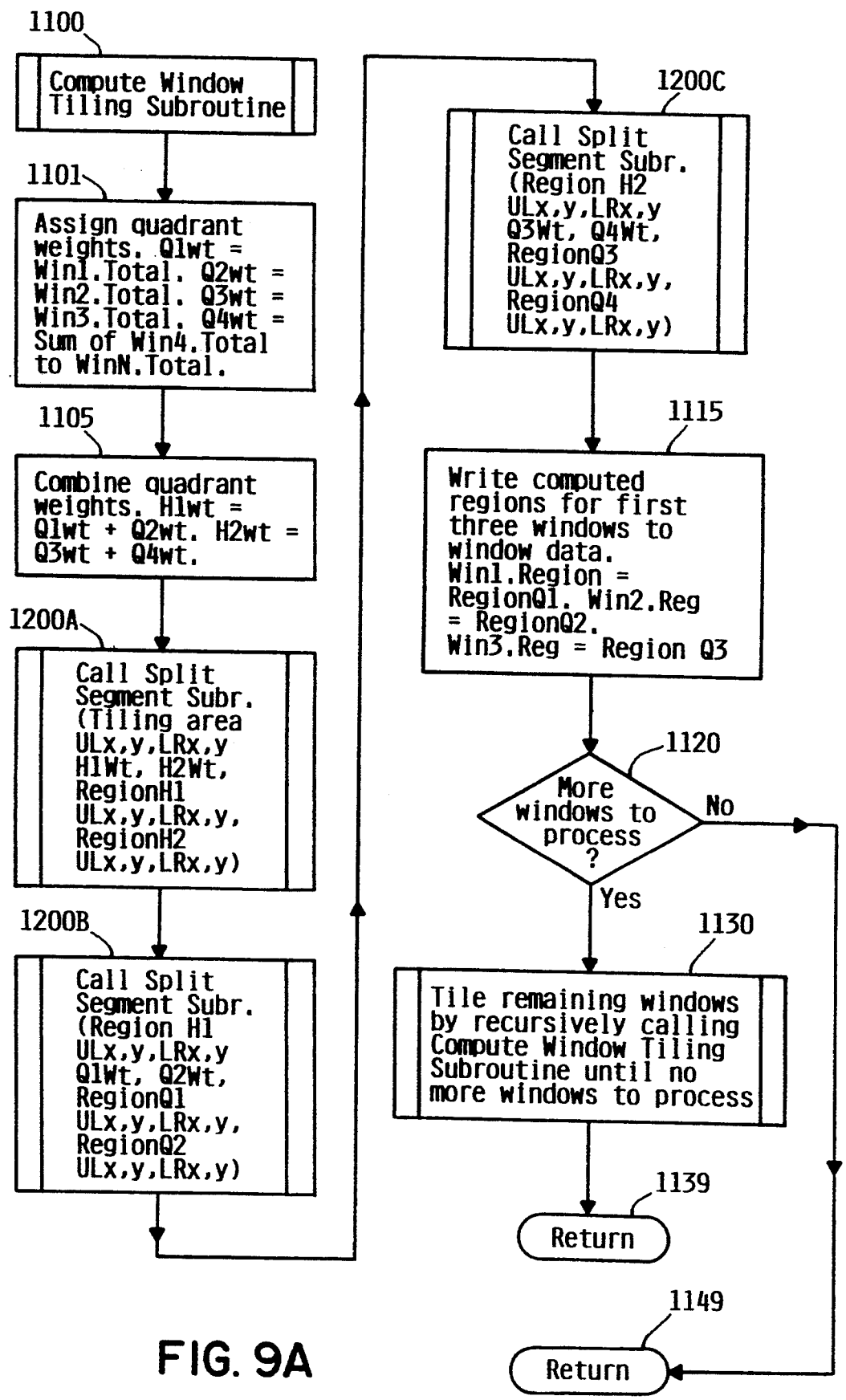

Block 901 clears the display of all data in a conventional manner. Block 903 sorts the window records in window data 40 in order of activity, from highest to lowest, according to the values in total column 43. Therefore, the most active window will now be the first record at the top of window data 40, and the least active window will be the last record at the bottom of window data 40. Block 905 checks the window records in window data 40 to see if any windows have been active less than the minimum threshold percentage. This is done by dividing the value in total column 43 in window data 40 for each window by the total time of all active windows non-identified control data 30 to arrive at a percentage that each window has been active, multiplying by 100, and comparing this value to the minimum threshold percentage contained in field 54 of control data 30. For each window that block 905 determines is under this threshold minimum percentage, block 905 puts "ICON" in region column 44 of control data 40 for later use. Flow of control then moves to block 1100, where the Compute Window Tiling Regions subroutine of FIG. 9A is called. A window list of all windows to process, sorted according to activity, is passed to this subroutine.

Compute Window Tiling Subroutine of FIG. 9A computes and fills in the values for region column 44 of window data 40 for each window that does not already have the value "ICON" in this column. Block 1101 begins by assigning four quadrant weights. The first quadrant (Q1wt) is given the value contained in total column 43 for the first window record (i.e. most active) in window data 40. Likewise, the second quadrant (Q2wt) is given the value contained in total column 43 for the second window record (i.e. next most active) in window data 40. The third quadrant (Q3wt) is given the value contained in total column 43 for the third window record (i.e. most active) in window data 40. The fourth quadrant (Q4wt) is given the value contained in total column 43 for the summation of the rest of the windows in window data 40. Note that block 1101 does not use the value in total column 43 for any quadrant weights if the expression "ICON" is in field 44 for a window. Instead, a "0" is added into these weights. A "0" is also used for the weight if there is not a window present.

Using our example data shown in window data 40 (sorted as shown in FIG. 3C), block 1101 would assign weights of 400, 350, 100, and 120 for Q1wt, Q2wt, Q3wt, and Q4wt, respectively. Q4wt is determined by adding the values in total column 43 for Word Perfect and Lotus 1-2-3 (70+50). The value in total column 43 for File Manager (30) is replaced by a 0 to be added into Q4wt, since block 905 determined that this window did not exceed the minimum threshold percentage, and put "ICON" in column 44.

Figures 1, 9B:
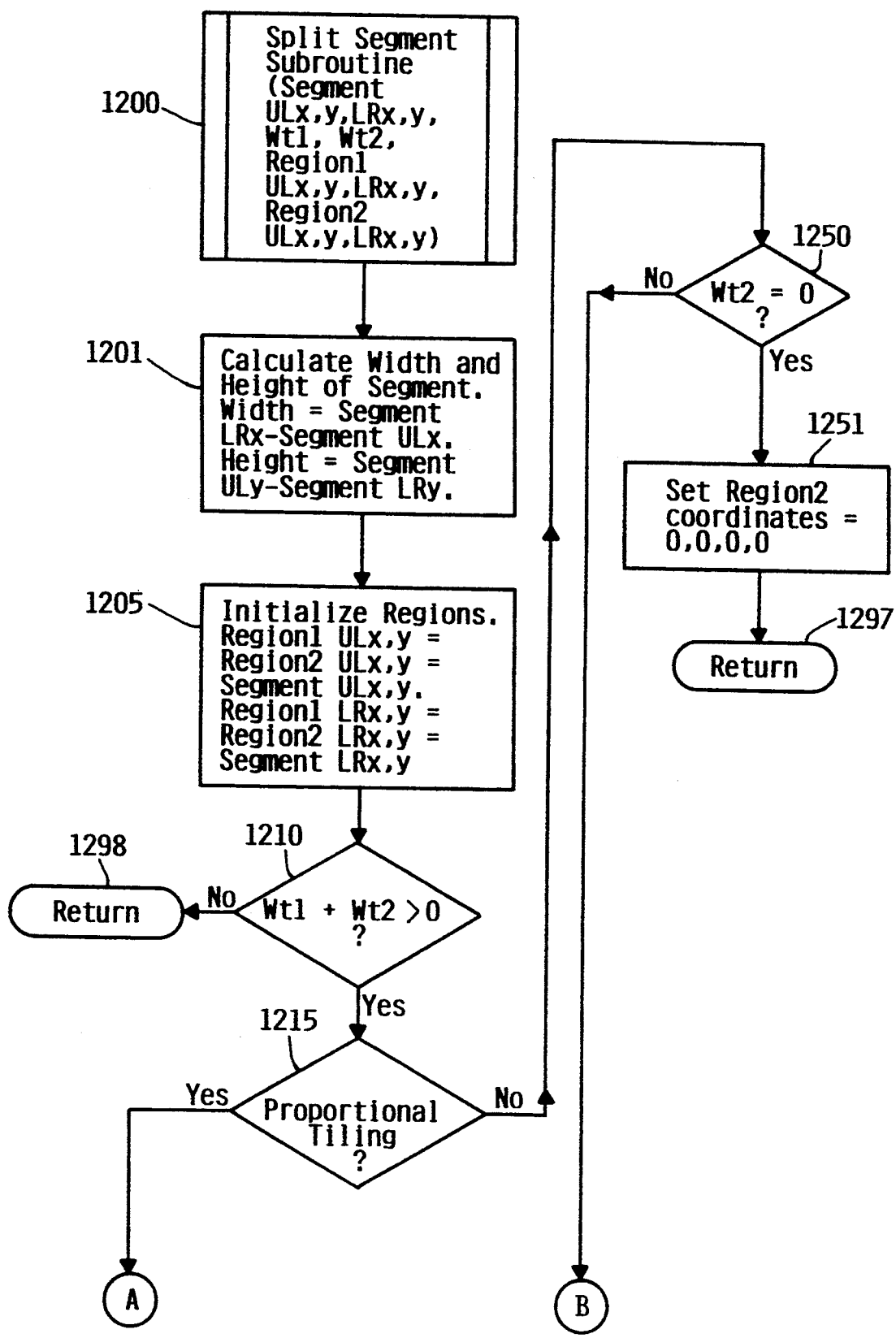
Figures 2, 9B:
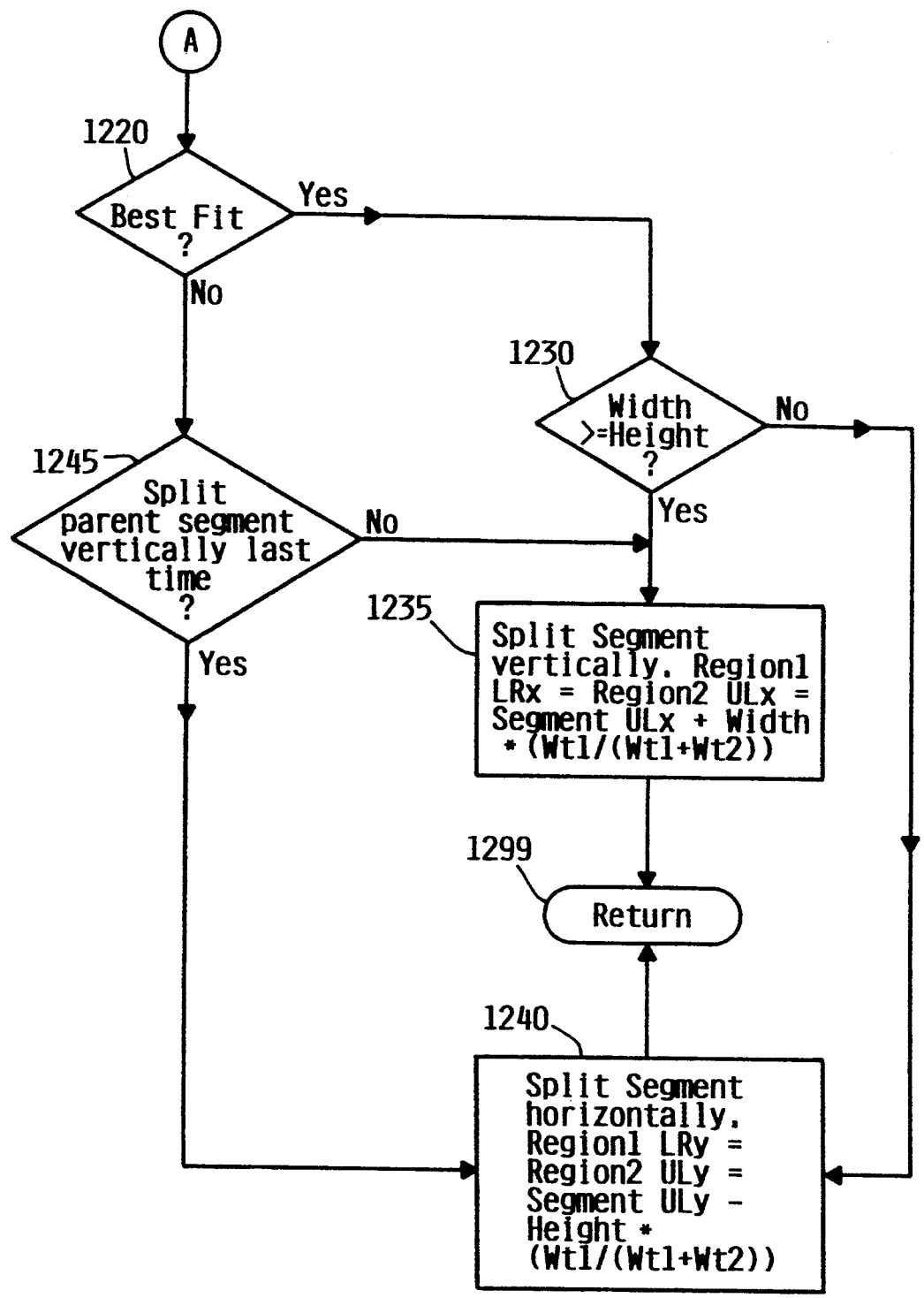
Figures 3, 9B:
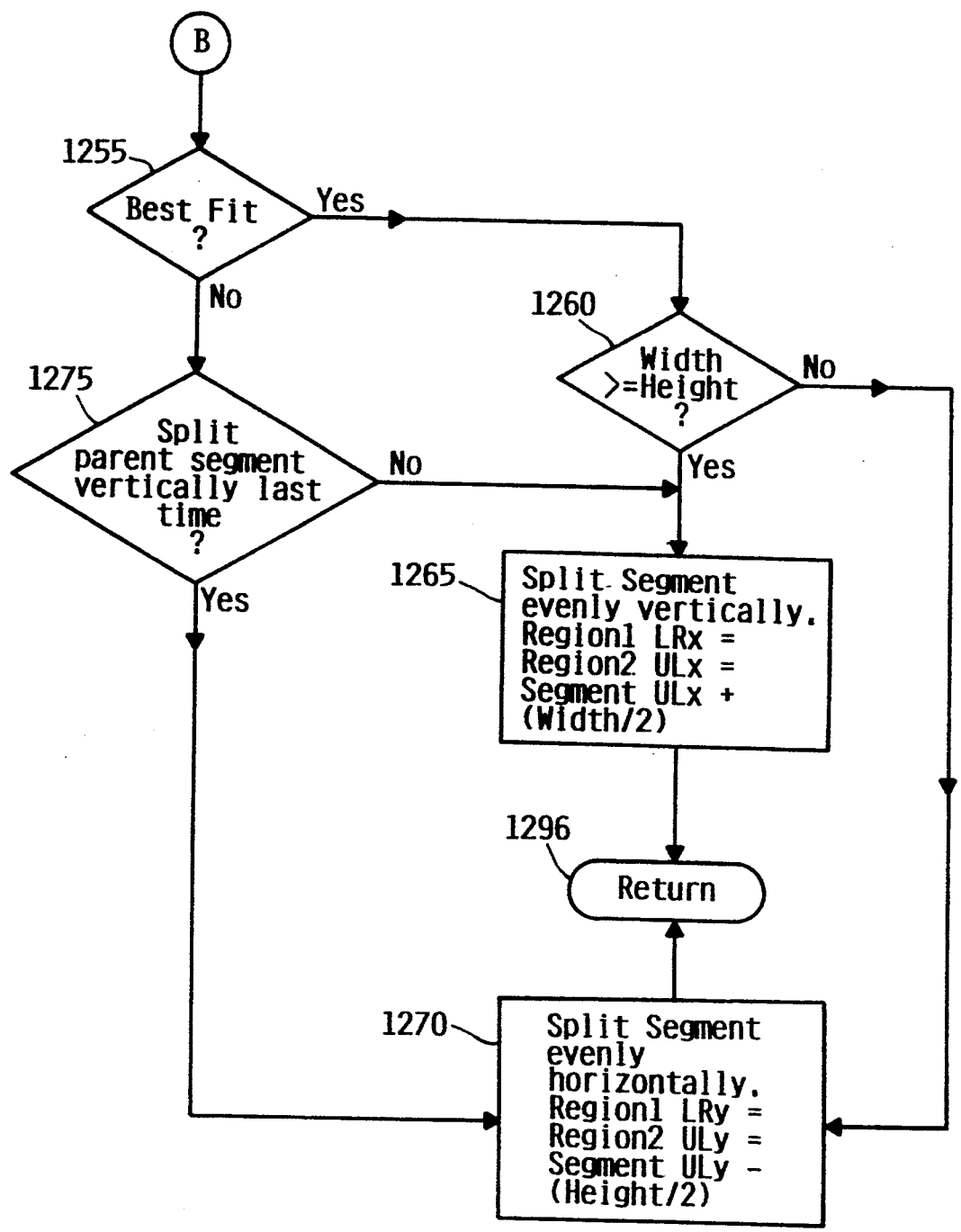

Block 1105 then combines the weights of Q1wt and Q2Wt to determine H1wt, and combines the weights of Q3wt and Q4wt to determine H2wt. In our example, H1wt=750 (400+350), and H2wt=220 (100+120). Split Segment Subroutine 1200 of FIG. 9B is then called for the first time in block 1200a. The following input parameters are passed to the subroutine: tiling area coordinates (0,140,200,0 in our example—see FIG. 2B), H1wt (750), and H2wt (120). Output parameters Region H1 and Region H2 are also passed to subroutine 1200. Subroutine 1200 will split the specified segment (the tiling area) and pass back the x,y coordinates of the upper left and lower right corners of the two regions it splits the segment into (RegionH1 and RegionH2).

Referring now to FIG. 9B, block 1201 calculates the width and height of the segment passed as the first input parameter from FIG. 9A. The width is calculated by subtracting the x coordinate of the upper left corner of the segment (0 in our example) from the x coordinate of the lower right corner of the segment (200 in our example). The height is calculated by subtracting the y coordinate of the lower right corner of the segment (also 0 in our example) from the y coordinate of the upper left corner of the segment (140 in our example). Therefore, block 1201 determines that the width of our segment is 200 and the height is 140. Block 1205 initializes the x,y coordinates of the two regions this segment will be split into to be the same as the x,y coordinates of the segment itself. Therefore, in our example, both segments will have upper left (UL) x,y coordinates of 0,140, and lower right (LR) x,y coordinates of 200,0.

Block 1210 asks if Wt1+Wt2 passed as input parameters>0. If not, the segment is not split into two regions, since there are no windows to put in these segments, and the subroutine returns to where it was called from in block 1298. If block 1210 was answered affirmatively, there is at least one window to put into a region, and flow of control continues to block 1215.

Block 1215 checks to see whether proportional tiling flag 52 in control data 30 is on. If so, block 1220 checks to see if best fit flag 53 in control data 30 is on. If so, as is the case in the preferred embodiment, flow of control moves to block 1230. Block 1230 checks to see if the width of the segment is greater than or equal to its height. If so, it will look better (and be the "best fit" if the segment is split vertically. This is performed by block 1235. Block 1235 sets the lower right (LR) x coordinate of Region1 and the upper left (UL) x coordinate of Region2 to be equal to the ULx coordinate of the segment to be split, plus the width of the segment multiplied by Wt1/Wt1+Wt2. This action is shown in FIG. 2C-1. Block 1235 splits up the segment (tiling area) by changing the Region1 LRx coordinate from 200 (initialized in block 1205) as follows: Region1 LRx=0+(200*750/(750+220))=155. The Region2 ULx coordinate is also changed to 155. Note that the Region1 LRx and the Region2 ULx coordinate values of 155 is actually rounded up from 154.63918, since under Presentation Manager window coordinates must normally be expressed as integers. While this rounding operation means that the window region is proportional plus or minus a round off error of 0.5 mm, for the purposes of this invention this will be considered to be the same as "proportional". After block 1235 is executed, the subroutine returns in block 1299 to block 1200*b* of FIG. 9A, passing the coordinates for RegionH1 and RegionH2 (using the values for Region1 and Region2) back as output parameters.

Referring again to FIG. 9A, Split Segment Subroutine 1200 of FIG. 9B is then called for the second time in block 1200*b*. The following input parameters are passed to the subroutine: Region H1 coordinates (0,140,155,0 in our example—see FIG. 2C-1) Q1wt (400), and Q2wt (350). Output parameters RegionQ1 and Region Q2 are also passed to subroutine 1200. Subroutine 1200 will split the RegionH1 into RegionQ1 and RegionQ2, passing back the x,y coordinates of the upper left and lower right corners of these two regions.

Referring again to FIG. 9B, block 1201 calculates the width and height of the segment passed as the first input parameter from FIG. 9A, as before. Block 1201 determines that the width of RegionH1 is 155 and the height is 140. Block 1205 initializes the x,y coordinates of the two regions this segment will be split into to be the same as the x,y coordinates of the segment itself (0,140,155,0 in our example).

Flow of control moves through blocks 1215, 1220, and 1230 as before, and block 1235 splits RegionH1 vertically. Block 1235 sets the lower right (LR) x coordinate of Region1 and the upper left (UL) x coordinate of Region2 to be equal to the ULx coordinate of the segment to be split, plus the width of the segment multiplied by Wt1/Wt1+Wt2. This action is shown in FIG. 2C-2. Block 1235 splits up the segment (RegionH1) by changing the Region1 LRx coordinate from 155 (initialized in block 1205) as follows: Region1 LRx=0+(155*400/(400+350))=83. The Region2 ULx coordinate is also changed to 83. After block 1235 is executed, the subroutine returns in block 1299 to block 1200*c* of FIG. 9A, passing the coordinates for RegionQ1 and RegionQ2 (using the values for Region1 and Region2) back as output parameters.

Referring again to FIG. 9A, Split Segment Subroutine 1200 of FIG. 9B is then called for the third time in block 1200*c*. The following input parameters are passed to the subroutine: Region H2 coordinates (155,140,200,0 in our example—see FIG. 2C-2) Q3wt (100), and Q4wt (120). Output parameters RegionQ3 and Region Q4 are also passed to subroutine 1200. Subroutine 1200 will split the RegionH2 into RegionQ3 and RegionQ4, passing back the x,y coordinates of the upper left and lower right corners of these two regions.

Referring again to FIG. 9B, block 1201 calculates the width and height of the segment passed as the first input parameter from FIG. 9A, as before. Block 1201 determines that the width of RegionH1 is 45 and the height is 140. Block 1205 initializes the x,y coordinates of the two regions this segment will be split into to be the same as the x,y coordinates of the segment itself (155,140,200,0 in our example).

Flow of control moves through blocks 1215, 1220 as before, but this time block 1230 is answered negatively, since the width is less than the height of Region H2. Therefore, flow of control moves to block 1240 to split Region H2 horizontally. Block 1240 sets the lower right (LR) y coordinate of Region1 and the upper left (UL) y coordinate of Region2 to be equal to the ULy coordinate of the segment to be split, minus the height of the segment multiplied by Wt1/Wt1+Wt2. This action is shown in FIG. 2C-3. Block 1240 splits up the segment (RegionH2) by changing the Region1 LRy coordinate from 0 (initialized in block 1205) as follows: Region1 LRy=140−(140*100/(100+120))=76. The Region2 ULy coordinate is also changed to 76. After block 1240 is executed, the subroutine returns in block 1299 to block 1115 of FIG. 9A, passing the coordinates for RegionQ3 and RegionQ4 (using the values for Region1 and Region2) back as output parameters.

Referring again to FIG. 9A, block 1115 writes the coordinates computed for the first three windows to region field 44 of window data 40. In our example, region field 44 for the most active window (TurboTax) is filled with Region Q1 coordinates 0,140,83,0. Region field 44 for the next most active window (Quicken) is filled with Region Q2 coordinates 83,140,155,0. Region field for the next most active window (Excel) is filled with Region Q3 coordinates 155,140,200,76. This is shown in FIG. 3C.

Block 1120 asks whether any more windows exist that needs to be processed. This is done by checking the window list passed to subroutine 1000 to see if there are more windows for which regions have not yet been created. Since in our example we have a fourth and a fifth window in the window list left to process, block 1120 is answered affirmatively.

Block 1130 recursively repeats Compute Window Tiling Subroutine 1100 by executing blocks 1101, 1105, 1200*a*, 1200*b*, 1200*c*, 1115, and 1120. This is done to further divide Region Q4 into enough regions so that there is a region for each window in window data 40 that doesn't have "ICON" in region field 44. Each time subroutine 1100 is called, the window list passed to subroutine 1100 only contains the windows for which regions have not yet been created. In our example, the window list passed to subroutine 1100 will contain the fourth and fifth window in window data 40, sorted as shown in FIG. 3C (i.e., Word Perfect MY.TXT and Lotus 1-2-3). If more than three windows are left in the window list passed to subroutine 1100, block 1130 will call subroutine 1100 multiple times until three or fewer windows are left in the window list, at which point subroutine 1100 will execute for the last time.

Since we have only two windows passed to subroutine 1100 in the window list in our example, block 1130 calls subroutine 1100 one time. Therefore, block 1101 is re-executed and quadrant weights are assigned as follows: Q1wt=70, Q2wt=50, Q3wt=0 and Q4wt=0. Block 1105 combines the quadrant weights so H1wt=120 and H2wt=0. Split segment subroutine 1200 is then again called in block 1200a. The following input parameters are passed to the subroutine: Region Q4 coordinates (155,76,200,0) in our example—see FIG. 2C-3) H1wt (120), and H2wt (0). Output parameters RegionQ4-H1 and Region Q4-H2 are also passed to subroutine 1200. Subroutine 1200 will split the RegionQ4 into RegionQ4-H1 and RegionQ4-H2, passing back the x,y coordinates of the upper left and lower right corners of these two regions.

Referring again to FIG. 9B, block 1201 calculates the width and height of the segment passed as the first input parameter from FIG. 9A, as before. Block 1201 determines that the width of RegionQ4 is 45 and the height is 76. Block 1205 initializes the x,y coordinates of the two regions this segment will be split into to be the same as the x,y coordinates of the segment itself (155,76,200,0 in our example).

Flow of control moves through blocks 1215, 1220 as before, but this time block 1230 is answered negatively, since the width is less than the height of Region Q4. Therefore, flow of control moves to block 1240 to split Region Q4 horizontally. Block 1240 sets the lower right (LR) y coordinate of Region1 and the upper left (UL) y coordinate of Region2 to be equal to the ULy coordinate of the segment to be split, minus the height of the segment multiplied by Wt1/Wt1+Wt2. This action is shown in FIG. 2C-3. Block 1240 attempts to split up the segment (RegionQ4) by changing the Region1 LRy coordinate from 0 (initialized in block 1205) as follows: Region1 LRy=76−(76*120/(120+0))=0. The Region2 ULy coordinate is changed to be 0 as well. Note that Region2 has no width at all, since the ULy coordinate and the LRy coordinate are both 0. This is an indication that there won't be any windows going into this region, and that this region will not be split any further. After block 1240 is executed, the subroutine returns in block 1299 to block 1200b of FIG. 9A, passing the coordinates for RegionQ4-H1 and RegionQ4-H2 (using the values for Region1 and Region2) back as output parameters. As will be seen later, Region Q4-H2 is never used, so it doesn't matter that this region has 0 width.

Referring again to FIG. 9A, Split Segment Subroutine 1200 of FIG. 9B is then called for the second time via block 1130 in block 1200b. The following input parameters are passed to the subroutine: Region Q4-H1 coordinates (155,76,200,0 in our example—see FIG. 2C-4) Q1wt (70), and Q4wt (50). Output parameters RegionQ4-Q1 and Region Q4-Q2 are also passed to subroutine 1200. Subroutine 1200 will split the RegionQ4-H1 into RegionQ4-Q1 and RegionQ4-Q2, passing back the x,y coordinates of the upper left and lower right corners of these two regions.

Flow of control moves through blocks 1215, 1220, and 1230 as before, to block 1240 to split Region Q4-H1 horizontally. Block 1240 sets the lower right (LR) y coordinate of Region1 and the upper left (UL) y coordinate of Region2 to be equal to the ULy coordinate of the segment to be split, minus the height of the segment multiplied by Wt1/Wt1+Wt2. This action is shown in FIG. 2C-3. Block 1240 splits up the segment (RegionQ4-H1) by changing the Region1 LRy coordinate from 0 (initialized in block 1205) as follows: Region1 LRy=76−(76*120/(70+50))=32. The Region2 ULy coordinate is also changed to 32. After block 1240 is executed, the subroutine returns in block 1299 to block 1200c of FIG. 9A, passing the coordinates for RegionQ4-Q1 and RegionQ4-Q2 (using the values for Region1 and Region2) back as output parameters.

Referring again to FIG. 9A, Split Segment Subroutine 1200 of FIG. 9B is then called for the third time by block 1130 in block 1200c. The following input parameters are passed to the subroutine: Region Q4-H2 coordinates (155,0,200,0 in our example) Q3wt (0), and Q4wt (0). Output parameters RegionQ4-Q3 and RegionQ4-Q3 are also passed to subroutine 1200. But before subroutine 1200 has a chance to split our degenerate, 0-width RegionQ4-H2, block 1210 adds up Wt1 and Wt2 and determines that they are not greater than 0. This indicates that there are already enough regions for windows, and the subroutine returns in block 1298 to block 1115 of FIG. 9A. The initialized values for the x,y coordinates of upper left and lower right corners of these two regions are passed back, thereby indicating that Region Q4-H2 was not split.

Referring again to FIG. 9A, block 1115 writes the coordinates for the computed regions for the first three windows to region field 44 of window data 40. In our example, region field 44 for the next most active window (WordPerfect) is filled with Region Q4-Q1 coordinates 155,76,200,32. Region field 44 for the next most active window (Lotus 1-2-3) is filled with Region Q4-Q2 coordinates 155,32,200,0. Since this is the last window, the execution of block 1115 stops here.

Block 1120 asks whether any more windows exist that needs to be processed. This is done by checking to see if there are any windows left in the window list passed to subroutine 1100 for which a region has not been created. Since in our example we only had two windows in our window list passed to subroutine 1100, and since regions have been created for both of these windows, block 1120 is answered negatively. The subroutine returns in block 1149 to block 1139 via block 1130 since block 1130 is what called recursively callable subroutine 1100. Block 1139 returns to block 1150 in FIG. 8.

Referring now to FIG. 8, blocks 1150 and 1155 position the windows on the display screen according to the data provided by the flowcharts of FIGS. 9A and 9B in region field 44 for each window in window data 40. For any window with "ICON" in region field 44, an icon is generated (using Presentation Manager). FIG. 2D shows how the windows of our example are presented to the user. When block 1150 indicates that all windows have been processed, block 1160 gives focus to the first window in the sorted window list (most active window). The program then loops back to block 401 to again look to see if the user selects display window tiling mode.

With apologies to the reader, we must now go back to FIGS. 9A and 9B to discuss the three alternate embodiments not yet discussed. FIG. 9A operates the same as previously discussed, except an additional parameter is passed to Split Segment Subroutine 1200 to indicate whether the segment to be split was itself split from a larger segment vertically or horizontally. A "horizontal" parameter is passed the first time the subroutine is called. If Tammy Taxpayer enabled the proportional parameter but did not enable the best fit parameter, she is using a first alternate embodiment of the invention, and display screen 17 appears as is shown in FIG. 2E. In this embodiment, block 1220 is answered negatively, since the best fit parameter is not enabled. Block 1245 acts as a switch, and causes block 1235 to be executed the first time a segment is split (thereby performing a vertical split), and causes block 1240 to be executed the next time that segment ("parent" segment) is split further (into two "child" segments), thereby performing a horizontal split. Splitting the tiling area into RegionH1 and RegionH2 is done vertically. Splitting RegionH1 into RegionQ1 and RegionQ2 is done horizontally. Splitting RegionH2 into RegionQ3 and RegionQ4 is also done horizontally. Further splitting of Region Q4 is done vertically, then horizontally, and so on, if necessary. The subroutine returns where it was called in block 1299. Information on how the segment was split is also passed back in block 1299.

If Tammy did not enable the proportional parameter but did enable the best fit parameter, she is using a second alternate embodiment of the invention, and display screen 17 appears as is shown in FIG. 2F. In this embodiment, block 1215 is answered negatively. Block 1250 determines if Wt2=0. If this is true, there is only one window to find a region for, so the segment is not split. Instead, block 1251 keeps the Region1 coordinates the same as they were initialized to in block 1205, but changes the Region2 coordinates to be 0,0,0,0 to indicate that this region does not exist. The subroutine returns to where it was called from in block 1297. If block 1250 is answered negatively, block 1255 asks if the best fit parameter is enabled. Since it is enabled in this embodiment, block 1255 is answered affirmatively. Block 1260 acts like previously discussed block 1230 and causes the segment to be split vertically if the width is greater than or equal to the height, and causes the segment to be split horizontally otherwise. Block 1265 operates much like previously discussed block 1235, but block 1265 always splits the segment evenly. Likewise, block 1270 operates much like previously discussed block 1240, but block 1275 always splits the segment evenly. After block 1265 or 1270 is executed, the subroutine returns to where it was called from in block 1296. Information on how the segment was split is also passed back in block 1296.

If Tammy did not enable the proportional parameter and did not enable the best fit parameter, she is using a third alternate embodiment of the invention, and display screen 17 appears as is shown in FIG. 2G. While FIG. 2G appears the same as FIG. 2F in our example, this will often not be the case. In this embodiment, block 1255 is answered negatively. Block 1275 operates similarly to previously discussed block 1245.

Figure 10:
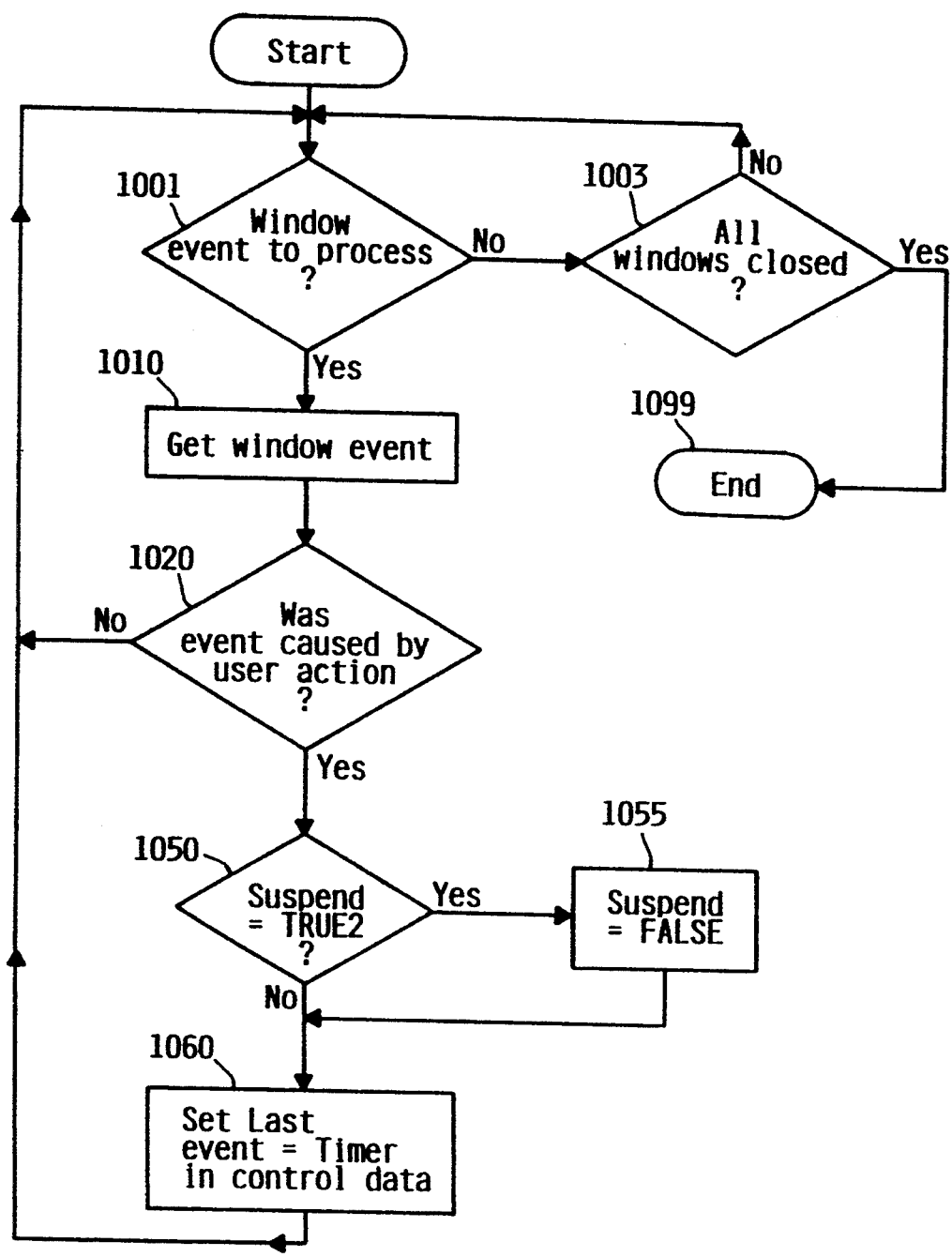

FIG. 10, which independently executes in processor 12 along with the flowcharts of FIGS. 5A–5B, FIG. 7, and FIG. 8, will now be discussed. Block 1001 checks to see if there is a window event to process. This is the same check that is done by block 110 of FIG. 5A. If block 1001 determines that there isn't a window event to process, block 1003 checks to see if all windows have been closed. If so, the program ends in block 1099. If not, the program loops back to block 1001 to again check to see if there is a window event to process. Once block 1001 is answered affirmatively, block 1010 gets the window event. Block 1020 asks if this window event was caused by a user action. If not, the program loops back to block 1001 to look for another window event to process. Note that FIGS. 5A–5B actually perform the event—FIG. 10 just looks for specific events that impact the window timing function of the invention. If block 1020 is answered affirmatively, block 1050 checks to see if suspend flag 34 of control data 30 is equal to TRUE2. If this flag is equal to TRUE2, the window timing function was suspended due to an inactivity timeout. Since the user has now done something, it is appropriate to restart the window timing function. This is done in block 1055 by changing the value of suspend flag 34 to FALSE, so that block 205 of FIG. 7 can be answered affirmatively and timer flag 32 in window data 30 can be incremented by block 208.

Referring again to FIG. 10, regardless of how block 1050 is answered, flow of control moves to block 1060, where last event flag 36 is set to be the value of timer 32 in control data 30. Last event flag 36 therefore contains the last time an event occurred that indicated user activity with one of the windows on the display screen. This information is used by blocks 115 and 118 of FIG. 5A to check to see if the specified inactivity timeout has been exceeded. Flow of control loops back to block 1001.

While this invention has been described with respect to the preferred embodiment and several alternate embodiments, it will be understood by those skilled in the art that various changes in detail may be made therein without departing from the spirit, scope add teaching of the invention. For example, the positioning of the most active window could be on the right side of the screen instead of the left with minor changes to blocks 1235, 1240, 1265 add 1270 of FIG. 9B, Therefore, cultural or personal differences in what would be considered to be the ,nest distinctive display position for the most active window can be taken into account. Accordingly, the herein disclosed is to be limited only as specified in the following claims.

What is claimed is:

1. A method for efficiently displaying a plurality of windows on a display screen, comprising the steps of:
   monitoring a length of time that each of said plurality of windows has been active; and
   displaying each of said plurality of windows within said display screen in a size proportional to said length of time being active.

2. The method of claim 1, wherein said displaying step further comprises the steps of:
   determining a tiling area on said display screen;
   splitting said tiling area into an H1 region and an H2 region;
   splitting said H1 region into a Q1 region and a Q2 region; and
   splitting said H2 region into a Q3 region and a Q4 region.

3. The method of claim 2, wherein said splitting said tiling area step is performed such that the size of said H1 region is proportional to said length of time that a first window and a second window have been active relative to said length of time that said first window through an Nth window have been active, and the size of said H2 region is proportional to said length of time that a third window through said Nth window have been active relative to said length of time that said first window through said Nth window have been active.

4. The method of claim 3, wherein said splitting said H1 region step is performed such that the size of said Q1 region is proportional to said length of time that said first window has been active relative to said length of time that said first window and said second window have been active, and the size of said Q2 region is proportional to said length of time that said second window has been active relative to said length of time that said first window and said second window have been active.

5. The method of claim 4, wherein said splitting said H2 region step is performed such that the size of said Q3 region is proportional to said length of time that a third window has been active relative to said length of time that said third window through said Nth window have been active, and the size of said Q4 region is proportional to said length of time that a fourth window through said Nth window have been active relative to said length of time that said third window through said Nth window have been active.

6. The method of claim 5, further comprising the steps of:
   displaying said first window in said Q1 region;
   displaying a second window in said Q2 region; and
   displaying a third window in said Q3 region.

7. The method of claim 6, further comprising the step of:
   splitting said Q4 region into a Q4–Q1 region and a Q4–Q2 region such that the size of said Q4–Q1 region is proportional to said length of time that a fourth window has been in focus relative to said length of time that said fourth window through said Nth window have been in focus, and the size of said Q4–Q2 region is proportional to said length of time that a fifth window has been in focus relative to said length of time that said fourth window through said Nth window have been in focus, wherein N=5;
   displaying said fourth window in said Q4–Q1 region; and
   displaying said fifth window in said Q4–Q2 region.

8. The method of claim 7, wherein said displaying step further comprises the steps of:
   determining that a sixth window has not been active long enough to exceed a minimum threshold;
   displaying said sixth window as an icon.

9. The method of claim 2, wherein said splitting said tiling area step is performed vertically if the width of said tiling area is greater than or equal to the height of said tiling area.

10. The method of claim 2, wherein said splitting said H1 region step is performed horizontally if said splitting said tiling area step was performed vertically.

11. The method of claim 2, wherein said splitting said tiling area step is performed horizontally if the width of said tiling area is less than the height of said tiling area.

12. The method of claim 2, wherein said splitting said H1 region step is performed vertically if said splitting said tiling area step was performed horizontally.

13. A computer system for efficiently displaying a plurality of windows on a display screen, comprising:
   a system unit, comprising:
     a processor;
     memory, connected to said processor;
     storage, connected to said processor;
     a display adapter, connected to said processor;
   a display, connected to said system unit;
   means in said processor that monitoring a length of time for each of said plurality of windows has been active; and
   means in said processor for displaying on said display each of said plurality of windows in a size proportional to said length of time being active.

14. A method for efficiently displaying a plurality of windows on a display screen, comprising the steps of:
   monitoring a length of time that each of said plurality of windows has been active;
   determining a tiling area on said display screen;
   splitting said tiling area into an H1 region and an H2 region wherein the size of said H1 region is proportional to said length of time that a first window and a second window have been active relative to said length of time that said first window through an Nth window has been active, and the size of said H2 region is proportional to said length of time that a third window through said Nth window have been active relative to said length of time that said first window through said Nth window have been active;
   splitting said H1 region into a Q1 region and Q2 region wherein the size of said Q1 region is proportional to said length of time that said first window has been active relative to said length of time that said first window and said second window have been active, and the size of said Q2 region is proportional to said length of time that said second window has been active relative to said length of time that said first window and said second window have been active;
   splitting said H2 region into a Q3 region and Q4 region; and
   displaying each of a plurality of windows within a region in a size proportional to said length of time being active.

15. The method of claim 14, wherein said splitting said H2 region is performed such that the size of said Q3 region is proportional to said length of time that a third window has been active relative to said length of time that said third window through said Nth window have been active, and the size of said Q4 region is proportional to said length of time that a fourth window through said Nth window have been active relative to said length of time that said third window through said Nth window have been active.

16. The method of claim 15, further comprising the steps of:
   displaying said first window in said Q1 region;
   displaying a second window in said Q2 region; and
   displaying a third window in said Q3 region.

17. The method of claim 16, further comprising the step of:
   splitting said Q4 region into a Q4–Q1 region and a Q4–Q2 region such that the size of said Q4–Q1 region is proportional to said length of time that a fourth window has been in focus relative to said length of time that said fourth window through said Nth window have been in focus, and the sizes of said Q4–Q2 region is proportional to said length of time that a fifth window has been in focus relative to said length of time that said fourth window through said Nth window have been in focus, wherein N=5;
   displaying said fourth window in said Q4–Q1 region; and
   displaying said fifth window in said Q4–Q2 region.

18. The method of claim 17, wherein said displaying step further comprises the steps of:
   determining that a sixth window has not been active long enough to exceed a minimum threshold; and
   displaying said sixth window as an icon.

* * * * *